United States Patent
Yamazaki et al.

(10) Patent No.: US 9,578,151 B2
(45) Date of Patent: Feb. 21, 2017

(54) SECURITY DEVICE AND INFORMATION PROCESSING DEVICE

(71) Applicant: Semiconductor Energy Laboratory Co., Ltd., Kanagawa-ken (JP)

(72) Inventors: Shunpei Yamazaki, Tokyo (JP); Moe Nishimaki, Kanagawa (JP); Nobuharu Ohsawa, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 0 days.

(21) Appl. No.: 15/071,503

(22) Filed: Mar. 16, 2016

(65) Prior Publication Data

US 2016/0269518 A1  Sep. 15, 2016

Related U.S. Application Data

(63) Continuation of application No. 14/488,985, filed on Sep. 17, 2014, now Pat. No. 9,294,602.

(30) Foreign Application Priority Data

Sep. 19, 2013 (JP) ................. 2013-194055

(51) Int. Cl.

| H04M 1/00 | (2006.01) |
|---|---|
| H04M 1/22 | (2006.01) |
| G08B 15/00 | (2006.01) |
| F21V 33/00 | (2006.01) |
| H04M 1/21 | (2006.01) |

(52) U.S. Cl.
CPC ............ H04M 1/22 (2013.01); F21V 33/0076 (2013.01); G08B 15/004 (2013.01); G03B 2215/0564 (2013.01); H04M 1/21 (2013.01)

(58) Field of Classification Search
None
See application file for complete search history.

(56) References Cited

U.S. PATENT DOCUMENTS

| 7,598,927 | B2 | 10/2009 | Yamazaki et al. |
|---|---|---|---|
| 8,319,714 | B2 | 11/2012 | Kojima et al. |
| 8,550,907 | B2 | 10/2013 | Yamazaki et al. |
| 8,791,878 | B2 | 7/2014 | Yamazaki et al. |
| 2005/0052348 | A1 | 3/2005 | Yamazaki et al. |
| 2011/0101880 | A1 | 5/2011 | Ribarich |
| 2014/0347555 | A1* | 11/2014 | Hirakata ............. G03B 15/03 348/371 |
| 2015/0003034 | A1 | 1/2015 | Nakamura et al. |
| 2015/0076475 | A1 | 3/2015 | Hirakata |

FOREIGN PATENT DOCUMENTS

JP  2009-130132 A  6/2009

* cited by examiner

*Primary Examiner* — Adolf Dsouza
(74) *Attorney, Agent, or Firm* — Husch Blackwell LLP

(57) ABSTRACT

A security device and an information processing device capable of maintaining information useful for confirming a occurrence of a crime which include a switch that is provided so as to be operable with a hand that holds a housing, a light-emitting element that emits pulsed light in accordance with the operation of the switch, an imaging unit that performs imaging in an emission direction of the pulsed light and supplies image information, and a communication unit that transmits the image information to a communication network are provided. This structure allows a user to emit the pulsed light to an assailant, which prevents crimes and transmit to the communication network.

12 Claims, 18 Drawing Sheets

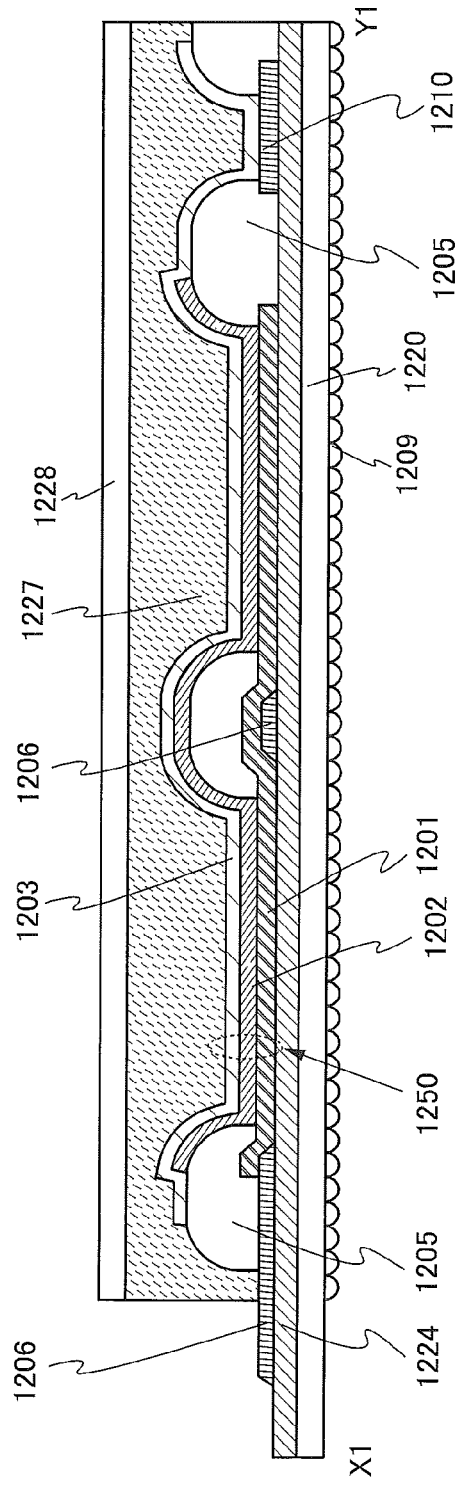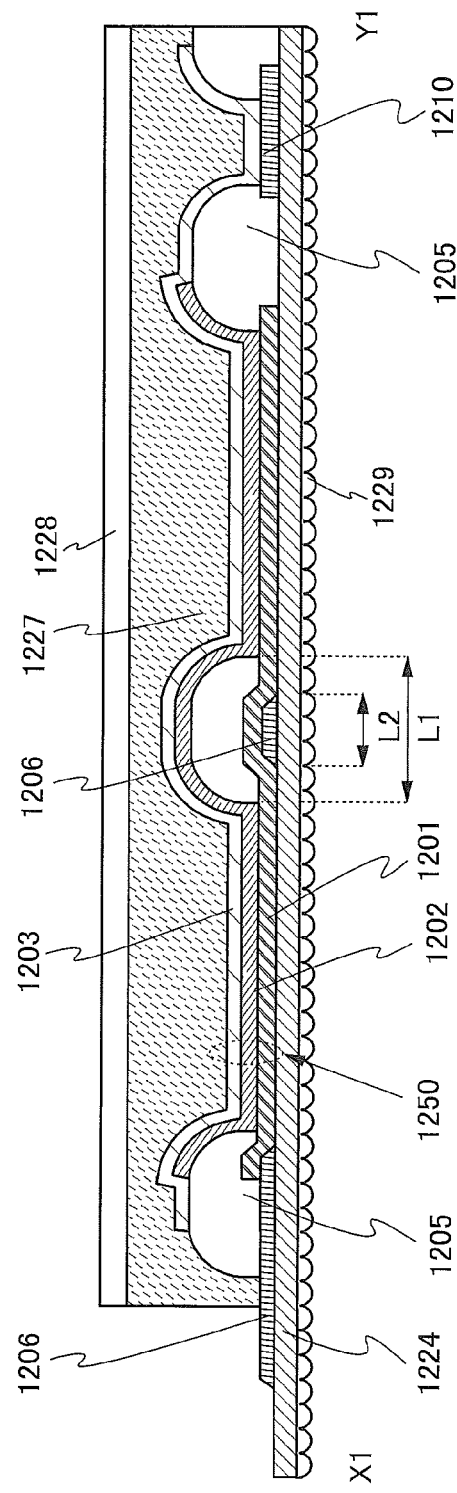

SECURITY DEVICE AND INFORMATION PROCESSING DEVICE

This application is a continuation of copending U.S. application Ser. No. 14/488,985, filed on Sep. 17, 2014 which is incorporated herein by reference.

BACKGROUND OF THE INVENTION

1. Field of the Invention

The present invention relates to an object, a method, or a manufacturing method, or relates to a process, a machine, manufacture, or a composition of matter. In particular, the present invention relates to, for example, a semiconductor device, a display device, a light-emitting device, a power storage device, a lighting device, a driving method thereof, or a manufacturing method thereof. Particularly, the present invention relates to, for example, a security device or an information processing device.

2. Description of the Related Art

The social infrastructures relating to means for transmitting information have advanced. This has made it possible to acquire, process, and send out many pieces and various kinds of information with the use of an information processing device not only at home or office but also at other visiting places.

With this being the situation, portable information processing devices are under active development.

An organic EL element can be formed into a film shape; thus, a large-area element can easily be formed. Therefore, the organic EL element has a high utility value as a surface light source that can be applied to lighting or the like.

For example, Patent Document 1 discloses a lighting device including an organic EL element.

REFERENCE

Patent Document

[Patent Document 1] Japanese Published Patent Application No. 2009-130132

SUMMARY OF THE INVENTION

An object of one embodiment of the present invention is to provide a novel security device. Another object is to provide a novel information processing device. Another object is to provide a novel lighting device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a security device including a housing, a switch provided so as to be operable with a hand that holds the housing, a start switch circuit including the switch and configured to supply a start signal when the switch is operated, a microcontroller configured to be supplied with the start signal and configured to supply a control pulse signal and a shutter signal, a switching circuit configured to be supplied with the control pulse signal and constant current and configured to supply a constant current pulse, a constant current supply configured to supply the constant current, a light-emitting element configured to be supplied with the constant current pulse and configured to emit pulsed light to an outside of the housing, an imaging unit configured to be supplied with the shutter signal and configured to perform imaging in an emission direction of the pulsed light and supply image information, and a communication unit configured to transmit the image information to a communication network.

One embodiment of the present invention is a security device including a housing, a switch provided so as to be operable with a hand that holds the housing, a start switch circuit including the switch and configured to supply a start signal when the switch is operated, a microcontroller configured to be supplied with the start signal and configured to supply a control pulse signal and a shutter signal, a constant current supply configured to be supplied with the control pulse signal and configured to supply a constant current pulse, a light-emitting element configured to be supplied with the constant current pulse and configured to emit pulsed light to an outside of the housing, an imaging unit configured to be supplied with the shutter signal and configured to perform imaging in an emission direction of the pulsed light and supply image information, and a communication unit configured to transmit the image information to a communication network.

The security device of one embodiment of the present invention includes the switch that is provided so as to be operable with a hand that holds the housing, the light-emitting element that emits the pulsed light in accordance with the operation of the switch, the imaging unit that performs imaging in the emission direction of the pulsed light and supplies the image information, and the communication unit that transmits the image information to the communication network. With the use of the security device having such a structure by a user, the pulsed light can be emitted to an assailant or the like, which prevents crimes. Furthermore, information including an image of a crime scene can be transmitted to the communication network. Consequently, a novel security device can be provided; or a novel information processing device that can maintain information useful for confirming the occurrence of a crime, a novel lighting device, a novel security device, a novel information processing device, or the like can be provided. Note that the descriptions of these effects do not disturb the existence of other effects. One embodiment of the present invention does not necessarily achieve all the effects listed above. Other effects will be apparent from and can be derived from the description of the specification, the drawings, the claims, and the like.

One embodiment of the present invention is any of the above security devices in each of which the start switch circuit is configured to supply the start signal on the basis of the operation of a plurality of switches and in each of which the plurality of switches is distributed among a first surface and a second surface facing the first surface, and the like of the housing.

A structure of the security device of one embodiment of the present invention includes the start switch circuit for supplying the start signal on the basis of the operation of the plurality of switches distributed between the facing surfaces of the housing, in addition to the above-described structure. Thus, operation due to incorrect operation can be more prevented than in the case of using a start switch circuit which is operated by the operation of one switch. Consequently, a novel security device that is less likely to perform incorrect operation can be provided. Furthermore, a novel information processing device capable of maintaining information useful for confirming the occurrence of a crime can be provided.

One embodiment of the present invention is any of the above security devices each including a human sensor circuit configured to monitor the emission direction of the pulsed light and supply a sensor signal; in the security device, the microcontroller is configured to supply the control pulse signal and the shutter signal when the sensor signal and the start signal are supplied.

The security device of one embodiment of the present invention includes the human sensor circuit that senses whether a human exists in a direction of light to be emitted by a user. Thus, the pulsed light can be made less likely to be emitted incorrectly in a direction in which a human does not exist. Consequently, a novel security device that is less likely to perform incorrect operation can be provided. Furthermore, a novel information processing device capable of maintaining information useful for confirming the occurrence of a crime can be provided.

One embodiment of the present invention is any of the above security devices in each of which the light-emitting element is an organic EL element.

The security device of one embodiment of the present invention includes the organic EL element in addition to the above-mentioned structure. This enables the security device to have a large light-emitting area and to be thin and lightweight. Consequently, a novel security device can be provided. Furthermore, a novel information processing device capable of maintaining information useful for confirming the occurrence of a crime can be provided.

One embodiment of the present invention is any of the above security devices in each of which the imaging unit includes an imaging element and an optical system for forming an image on the imaging element and in each of which one surface of the housing is provided with the light-emitting element and the optical system so as to be adjacent to the light-emitting element.

The security device of one embodiment of the present invention includes the light-emitting element and the optical system which are provided for one surface of the housing, in addition to the above-described structure. Thus, the imaging unit can easily face in an emission direction of the pulsed light. Consequently, a novel security device can be provided. Furthermore, a novel information processing device capable of maintaining information useful for confirming the occurrence of a crime can be provided.

One embodiment of the present invention is any of the above security devices each including a positional information acquiring circuit capable of being supplied with the shutter signal and supplying positional information acquired from a global positioning system (GPS); in the security device, the communication unit is configured to transmit the positional information to the communication network.

The security device of one embodiment of the present invention includes the positional information acquiring circuit in addition to the above-mentioned structure. This makes it possible to transmit, to the communication network, positional information on the location where a user operates the security device either alone or in combination with information including an image of a crime scene and/or information including a message asking for help and to maintain image information useful for confirming the occurrence of a crime. Consequently, a novel security device can be provided. Furthermore, a novel information processing device capable of maintaining information useful for confirming the occurrence of a crime can be provided.

One embodiment of the present invention is an information processing device including an arithmetic unit configured to be supplied with image information, positional information, and an operation instruction and configured to supply communication information and display information; an input/output unit configured to be supplied with the communication information and the display information and configured to supply the image information, the positional information, and the operation instruction; and a housing storing the arithmetic unit and the input/output unit.

The input/output unit includes a switch provided so as to be operable with a hand that holds the housing; a start switch circuit including the switch and configured to supply a start signal when the switch is operated; a microcontroller configured to be supplied with the start signal and configured to supply a control pulse signal and a shutter signal; a switching circuit configured to be supplied with the control pulse signal and constant current and configured to supply a constant current pulse; a constant current supply configured to supply the constant current; a light-emitting element configured to be supplied with the constant current pulse and configured to emit pulsed light to an outside of the housing; an imaging unit configured to be supplied with the shutter signal and configured to perform imaging in an emission direction of the pulsed light and supply the image information; a positional information acquiring circuit capable of being supplied with the shutter signal and supplying the positional information; a communication unit configured to transmit the communication information to a communication network; an input mechanism configured to supply the operation instruction; and a display unit configured to be supplied with the display information and configured to display the display information. The communication unit is configured to transmit the image information to the communication network.

The information processing device of one embodiment of the present invention includes the switch that is provided so as to be operable with a hand that holds the housing, the light-emitting element that emits pulsed light in accordance with the operation of the switch, the imaging unit that performs imaging in the emission direction of the pulsed light and supplies the image information, and the communication unit that transmits the image information to the communication network. With the use of the information processing device having such a structure by a user, the pulsed light can be emitted to an assailant, which prevents crimes. Furthermore, information including an image of a crime scene can be transmitted to the communication network. Consequently, a novel information processing device that can maintain information useful for confirming the occurrence of a crime can be provided.

According to one embodiment of the present invention, a novel security device can be provided. Furthermore, a novel information processing device capable of maintaining information useful for confirming the occurrence of a crime can be provided.

BRIEF DESCRIPTION OF THE DRAWINGS

FIGS. 10A and 10B each illustrate a light-emitting panel.

DETAILED DESCRIPTION OF THE INVENTION

Figure 1A:
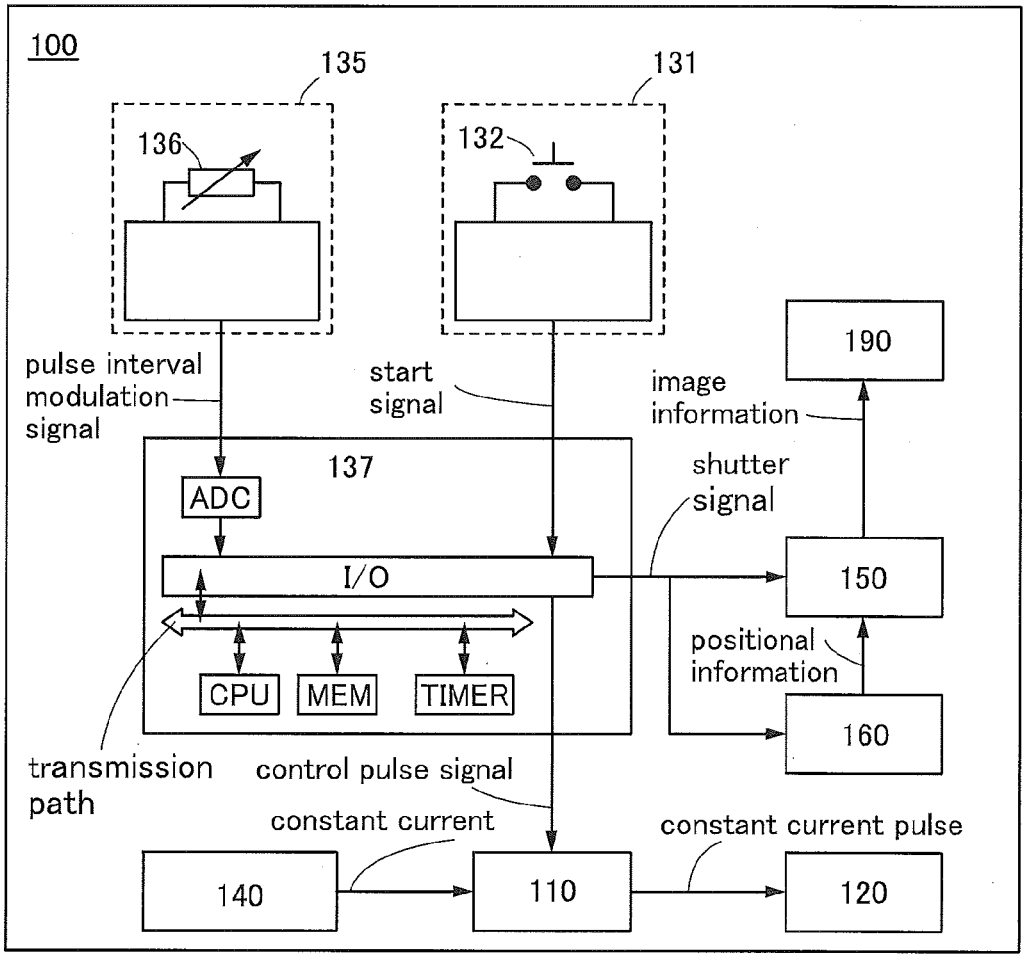
FIGS. 1A to 1C illustrate a block diagram of a structure and a usage state of a security device according to an embodiment.

A security device of one embodiment of the present invention includes a switch that is provided so as to be operable with a hand that holds a housing, a light-emitting element that emits pulsed light in accordance with the operation of the switch, an imaging unit that performs imaging in an emission direction of the pulsed light and supplies image information, and a communication unit that transmits image information to a communication network.

With the use of the security device having such a structure by a user, the pulsed light can be emitted to an assailant or the like, which prevents crimes. Furthermore, information including an image of a crime scene can be transmitted to the communication network. Consequently, a novel security device can be provided, or a novel information processing device that can maintain information useful for confirming the occurrence of a crime can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, a structure of a security device of one embodiment of the present invention is described with reference to FIGS. 1A to 1C and FIGS. 2A to 2D.

Figure 1B:
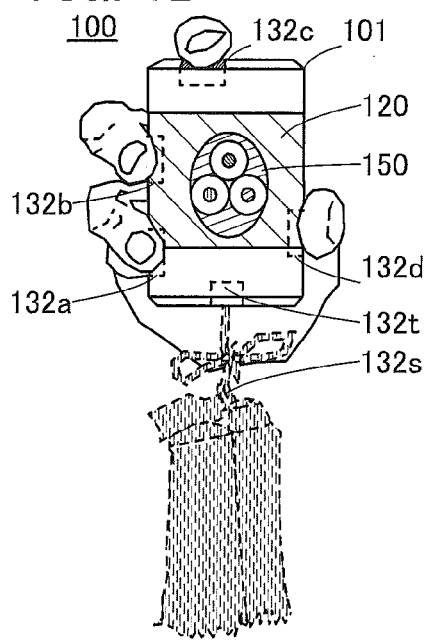
Figure 1C:
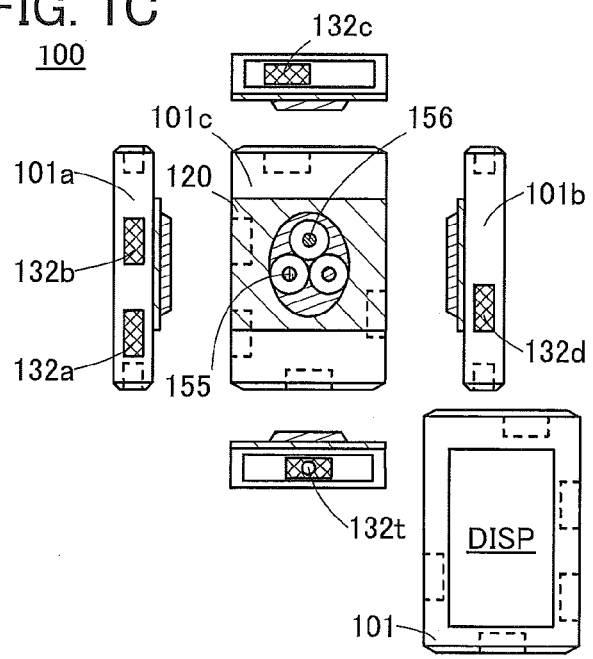

FIG. 1A is a block diagram illustrating a structure of a security device 100 of one embodiment of the present invention. FIG. 1B is an external view illustrating a structure and a usage state of the security device 100 shown in FIG. 1A. FIG. 1C shows six sides views illustrating the appearance of the security device 100 shown in FIG. 1A.

FIGS. 2A to 2D illustrate structures for supplying a constant current pulse from a constant current supply 140 of the security device 100 to the light-emitting element 120.

The security device 100 described in this embodiment includes a housing 101, a switch 132 that is provided so as to be operable with a hand that holds the housing 101, and a start switch circuit 131 that includes the switch 132 and supplies a start signal when the switch 132 is operated (see FIGS. 1A to 1C).

The security device 100 includes a microcontroller 137 that is supplied with the start signal and supplies a control pulse signal and a shutter signal, a switching circuit 110 that is supplied with the control pulse signal and constant current and supplies the constant current pulse, the constant current supply 140 that supplies the constant current, and a light-emitting element 120 that is supplied with the constant current pulse and emits pulsed light to the outside of the housing 101.

The security device 100 includes an imaging unit 150 that is supplied with the shutter signal, performs imaging in an emission direction of the pulsed light, and supplies image information; and a communication unit 190 that transmits the image information to a communication network.

The security device 100 of one embodiment of the present invention includes the switch 132 that is provided so as to be operable with a hand that holds the housing 101, the light-emitting element 120 that emits the pulsed light in accordance with the operation of the switch 132, the imaging unit 150 that performs imaging in an emission direction of the pulsed light and supplies the image information, and the communication unit 190 that transmits the image information to the communication network. With the use of the security device having such a structure by a user, the pulsed light can be emitted to an assailant or the like, which prevents crimes. Furthermore, information including an image of a crime scene can be transmitted to the communication network. Consequently, a novel security device can be provided, or a novel information processing device that can maintain information useful for confirming the occurrence of a crime can be provided.

The security device 100 described in this embodiment includes a pulse interval modulation circuit 135. The pulse interval modulation circuit 135 includes a variable resistor 136 and supplies a pulse interval modulation signal.

<Security Device>

Components included in the security device 100 are described below.

<<Housing>>

The housing 101 is provided with the light-emitting element 120, the imaging unit 150, and a switch (FIG. 1B).

It is preferable that the housing 101 be of a size that a user of the security device 100 can hold. It is particularly preferable that the housing 101 be of a size that the user can hold with one hand. For example, the housing 101 can be held with a thumb, a forefinger, an a middle finger.

The switch is provided in a position at which the switch can operated with a hand that holds the housing 101.

It is particularly preferable that the start switch circuit 131 have a structure which supplies the start signal at the time of the operation of a plurality of switches. The plurality of switches (a switch 132a, a switch 132b, a switch 132c, and a switch 132d) is distributed among a first surface 101a, a second surface 101b facing the first surface 101a, and the like of the housing 101 (see FIG. 1C).

The security device 100 includes the start switch circuit 131 that supplies the start signal on the basis of the operation of the plurality of switches 132 distributed among the facing surfaces of the housing 101. The start switch circuit 131 having this structure can be prevented from being operated by incorrect operation as compared to a start switch circuit which is operated by the operation of one switch. Consequently, a novel security device which is less likely to perform incorrect operation can be provided. Furthermore, a novel information processing device capable of maintaining information useful for confirming the occurrence of a crime can be provided.

For example, the switch 132a, the switch 132b, the switch 132c, and the switch 132d are provided in portions of the housing 101 where the light-emitting element 120 is not provided. Thus, a user (also referred to as victim) who has been unexpectedly attacked by an assailant or the like can correctly point the light-emitting element 120 at the assailant. Furthermore, the pulsed light can be emitted with simple operation of the security device 100.

A switch 132t to which an end portion of a strap 132s is attached may be provided for the housing 101. The switch 132t can be operated by pulling out the strap 132s with one hand while the housing 101 is held with the other hand.

The security device 100 can be configured so as to be operated when two or more of the switches are operated. Such a structure can suppress the occurrence of a malfunction in which the security device 100 is operated incorrectly by a user of the security device.

For example, the security device 100 can be configured so as to be operated when two or more of the switches selected from the switch 132a, the switch 132b, the switch 132c, and the switch 132d are operated. Furthermore, the security device 100 can be operated by pulling out the strap 132s with one hand while the other hand presses any of the switches.

<<Start Switch Circuit>>

The start switch circuit 131 can supply the start signal. The start switch circuit 131 includes the switch 132 and supplies the start signal with a high level or a low level in a period in which the switch 132 is operated (see FIG. 1A).

Note that the start switch circuit 131 can also supply the control pulse signal. For example, the start switch circuit 131 can be configured using the switch 132, a latch circuit, and a monostable multivibrator.

Specifically, the switch 132 is used to supply a high or low signal to the latch circuit. The latch circuit supplies a trigger signal. The monostable multivibrator supplied with the trigger signal supplies a rectangular wave with a predetermined width as the control pulse signal.

<<Pulse Interval Modulation Circuit>>

The pulse interval modulation circuit 135 can supply the pulse interval modulation signal. For example, a voltage changed using the variable resistor 136 can be used for the pulse interval modulation signal. The pulse intervals can be adjusted so that light emitted from the light-emitting element 120 is perceived as pulsed light by an assailant. Specifically, the light is emitted at less than 60 Hz, preferably less than or equal to 20 Hz, particularly preferably less than or equal to 5 Hz. The light is not necessarily emitted at regular intervals and may be emitted at irregular intervals.

<<Microcontroller>>

The microcontroller 137 can be supplied with the start signal and the pulse interval modulation signal and can supply the control pulse signal and the shutter signal.

The microcontroller 137 includes an arithmetic unit CPU, a timer unit TIMER, an analog-to-digital converter ADC, an input/output unit I/O, a memory unit MEM, a transmission path through which a data signal is transmitted, and the like.

The input/output unit I/O can be supplied with the start signal and the pulse interval modulation signal and can supply the control pulse signal and the shutter signal.

The analog-to-digital converter ADC converts an analog signal to a digital signal. For example, the analog-to-digital converter ADC converts the supplied pulse interval modulation signal to a digital signal and supplies the digital signal.

The arithmetic unit CPU processes supplied data in accordance with a program stored in the memory unit MEM, and supplies the processed data.

The timer unit TIMER can measure, in accordance with an instruction, predetermined time to supply the control pulse signal and the shutter signal at substantially the same time after a lapse of the predetermined time or to supply the control pulse signal and the shutter signal every predetermined time.

The timer unit TIMER can measure time for determining a width (half width) of the control pulse signal. For example, a predetermined width of the control pulse signal can be greater than or equal to 1 millisecond and less than or equal to 1000 milliseconds, preferably greater than or equal to 10 milliseconds and less than or equal to 100 milliseconds.

Thus, the pulsed light can be emitted to an assailant one time or repeatedly using the security device to frighten the assailant, which prevents crimes. Furthermore, an image of the crime scene can be taken by the imaging unit 150, and information useful for confirming the occurrence of the crime can be maintained.

The memory unit MEM stores a program to be executed by the arithmetic unit CPU.

For example, in the case where a period in which the start signal is supplied is shorter than predetermined time, the microcontroller 137 supplies the control pulse signal one time.

In the case where the period in which the start signal is supplied is longer than or equal to the predetermined time, the microcontroller 137 supplies the control pulse signal and the shutter signal plural times at intervals depending on the pulse interval modulation signal.

When the microcontroller 137 supplies the control pulse signal and the shutter signal plural times, the number of times of supplying the control pulse signal and the shutter signal can be predetermined. Alternatively, the control pulse signal and the shutter signal can be supplied as many times as possible in a period in which the start signal is continuously supplied. Further alternatively, the control pulse signal and the shutter signal can be supplied as many times as possible in a period from the time when the supply of the start signal is stopped to the time when the supply of the start signal is started again.

Note that the shutter signal may be supplied every time the control pulse signal is supplied, may be supplied every time the control pulse signal is supplied predetermined times, or may be supplied concurrently with a predetermined number of control pulses.

A structure in which the control pulse signal can be intermittently supplied until the start signal is supplied again is described below.

The start signal with a high level or a low level is supplied to the microcontroller 137 in a standby state with the switch 132. The microcontroller 137 supplies, to the switching circuit 110, a rectangular wave with a predetermined width as the control pulse signal and measures time in which the start signal is supplied.

In the case where the period in which the start signal is supplied is shorter than the predetermined time, the microcontroller 137 supplies the control pulse signal one time and then returns to a standby state.

In the case where the period in which the start signal is supplied is longer than or equal to the predetermined time, the microcontroller 137 determines a pulse interval in accordance with the digital signal obtained by converting the pulse interval modulation signal, and intermittently supplies the control pulse signal at predetermined pulse intervals until the start signal is supplied again.

<<Constant Current Supply>>

Figure 2A:
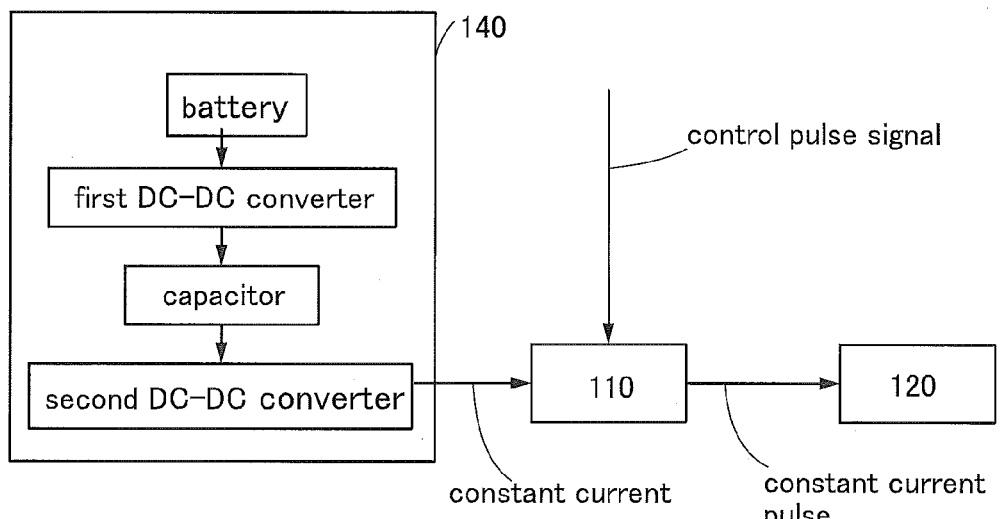
FIGS. 2A to 2D illustrate structures of a security device according to an embodiment.

The constant current supply 140 includes a battery for supplying a first voltage, a first DC-DC converter that is supplied with the first voltage and supplies a second voltage higher than the first voltage, a capacitor that is supplied with the second voltage and supplies electric charge, and a second DC-DC converter that can be supplied with the electric charge and supply the constant current (see FIG. 2A).

Note that a primary battery or a secondary battery can be used for the battery. As the secondary battery, a nickel-metal-hydride battery, a lead-acid battery, a lithium-ion battery, or the like can be used.

A plurality of batteries may be provided. One of the batteries may be used for making the light-emitting element 120 emit light and performing imaging using the imaging unit 150, and the other battery may be used for transmitting the image using the communication unit 190. Owing to such a structure, in the case where the light emission of the light-emitting element 120 and the imaging using the imaging unit 150 make one of the batteries run down, the communication unit 190 can transmit acquired image information and positional information using the other battery.

The other battery can serve as an emergency battery for connection by the communication using the communication unit 190 in an emergency. In particular, an electric double layer capacitor is preferably used for the other battery.

The first DC-DC converter supplies the second voltage obtained by stepping up the voltage (the first voltage) of the battery.

The capacitor is charged with the second voltage.

The second DC-DC converter is supplied with the electric charge stored in the capacitor and supplies the constant current.

Figure 2B:
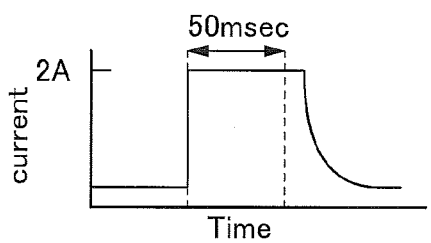

An example of a change over time of the current supplied by the constant current supply 140 is illustrated in FIG. 2B.

With this structure, the second DC-DC converter can supply the constant current while the capacitor supplies the electric charge to the second DC-DC converter. Note that when the electric charge stored in the capacitor is less than a predetermined level, the second DC-DC converter cannot supply the constant current.

The constant current supply 140 can supply the constant current for a period at least longer than the width of the control pulse signal (e.g., 50 milliseconds) supplied by the microcontroller 137.

When the current flows in the switching circuit 110, the electric charge stored in the capacitor is consumed; eventually, it becomes impossible for the constant current supply 140 to supply the constant current. As a result, a current that is not a rectangular wave flows in the light-emitting element 120, whereby the light-emitting element 120 emits light at luminance lower than predetermined luminance.

Light that is emitted at a luminance lower than a predetermined luminance and is poor in intensity is less effective in making an assailant flinch; as a result, power is consumed wastefully.

Figure 2C:
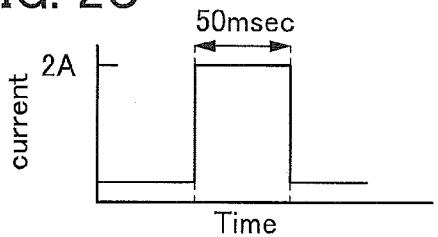

Before the constant current supply 140 is unable to continue the supply of constant current, the switching circuit 110 stops current supply. Thus, consumption of unnecessary power can be reduced. Note that an example of the current supplied by the switching circuit 110 is illustrated in FIG. 2C.

<<Control Circuit>>

Figure 2D:
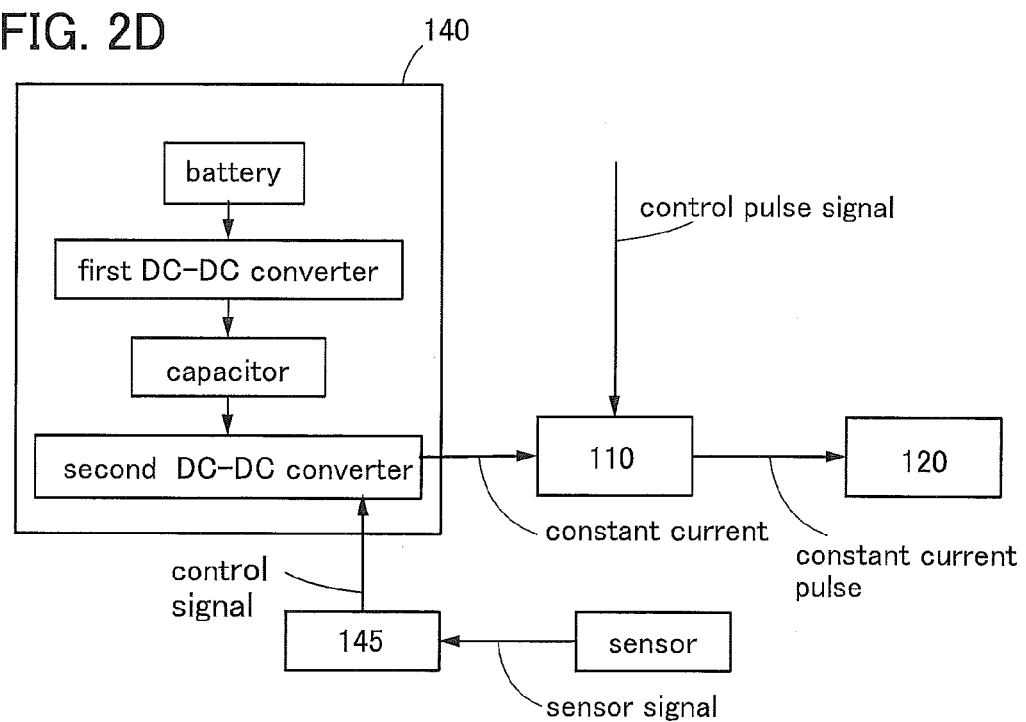

The amount of current to be supplied from the constant current supply 140 may be controlled in accordance with the brightness of an environment in which the security device 100 is used, the distance to the assailant, or the usage history of the light-emitting element (see FIG. 2D).

The security device 100 can include a sensor that supplies a sensor signal and a control circuit 145 that is supplied with the sensor signal and supplies a control signal, and the constant current supply 140 can be supplied with the control signal and can supply constant current whose amount depends on the control signal.

The amount of current to be supplied to the constant current supply 140 can be controlled by controlling the second DC-DC converter using the control signal.

Examples of the sensor for supplying the sensor signal include an optical sensor that senses the brightness of an environment in which the security device 100 is used and a distance sensor that senses the distance to the assailant. Specifically, a photodiode, an ultrasonic sensor, or the like can be used.

The degree of degradation of the light-emitting element 120 can be estimated using a memory circuit that stores the usage history of the light-emitting element 120. The amount of current to be supplied from the constant current supply 140 may be controlled so that degradation due to use of the light-emitting element 120 is compensated.

<<Switching Circuit>>

The switching circuit 110 supplies the constant current pulse to the light-emitting element 120 while being supplied with the constant current and the control pulse signal.

For example, a power transistor can be used for the switching circuit 110. Specifically, the switching circuit 110 can be configured such that the control pulse signal is supplied to a gate of the power transistor, the constant current is supplied to a first electrode of the power transistor, and the light-emitting element 120 is electrically connected to a second electrode of the power transistor. For example, a current of 2 A can be supplied to the light-emitting element 120 for 50 milliseconds.

<<Light-Emitting Element>>

Any of a point light source, a line light source, and a planar light source can be used for the light-emitting element 120. Examples of the light-emitting element 120 are a light-emitting diode, a xenon lamp, and an organic EL element.

One or more of the light-emitting elements 120 may be used. A light-emitting panel including one support substrate provided with a plurality of light-emitting elements can be used.

A plurality of light-emitting elements may be used, and the light-emitting elements may emit light of different colors.

Constant current circuits may be prepared in accordance with emission colors of the light-emitting elements that emit light of different colors to independently control the amount of current to be supplied to the light-emitting elements that emit light of different colors.

Thus, color and color temperature of light emission can be made variable. As a result, the imaging unit 150 can obtain image information of a photographic subject, an environment, an atmosphere, or the like with high reproducibility.

A flexible light-emitting panel fabricated using a flexible material for a support substrate or the like can be placed along the housing having a curved surface. In that case, the light-emitting device can be placed regardless of the design of the housing. For example, a flash can be placed along a camera housing having a curved surface.

An organic EL element can be used for the light-emitting element 120. The security device 100 including an organic EL element can have a large light-emitting area of the light-emitting element 120 and can be thin and lightweight.

Note that a structure of the light-emitting panel including the organic EL element is described in detail in Embodiment 4, and a structure of the organic EL element is described in detail in Embodiment 5.

The total area of a light-emitting portion of the light-emitting panel including the organic EL element is, for example, greater than or equal to 0.5 cm$^2$ and less than or equal to 1 m$^2$, preferably greater than or equal to 5 cm$^2$ and less than or equal to 200 cm$^2$, more preferably greater than or equal to 15 cm$^2$ and less than or equal to 100 cm$^2$.

In the light-emitting panel including the organic EL element, the density of current flowing in the light-emitting element in an emission state is greater than or equal to 10 mA/cm$^2$ and less than or equal to 2000 mA/cm$^2$, for example.

<<Imaging Unit>>

The imaging unit 150 is supplied with the shutter signal, performs imaging in an emission direction of the pulsed light, and supplies image information.

The imaging unit 150 includes an imaging element and an optical system 155 for forming an image on the imaging element (see FIG. 1C).

For the imaging element, a charge coupled device (CCD) or a complementary metal oxide semiconductor (CMOS) can be used. For the optical system 155, a lens, a diaphragm, an auto-focusing system, or the like can be used.

One surface 101c of the housing 101 is provided with the light-emitting element 120 and the optical system 155 adjacent to the light-emitting element 120.

For example, the surface 101c, which is different from the first surface 101a provided with the switches of the housing 101 and the second surface 101b facing the first surface 101a, can be provided with the light-emitting element 120 and the optical system 155 surrounded by the light-emitting element 120, in the housing 101 (see FIG. 1C).

Thus, the imaging unit 150 can be easily made to point in an emission direction of the pulsed light to perform imaging. Furthermore, the light-emitting element can be provided in a position on which a shadow is not formed by a finger operating the switch, so that light emitted from the light-emitting element can be effectively used. As a result, a novel security device can be provided. Furthermore, a novel information processing device capable of maintaining information useful for confirming the occurrence of a crime can be provided.

In the case where the shutter signal is supplied plural times, the imaging unit 150 can perform imaging plural times, so that a plurality of pieces of image information can be supplied.

The imaging unit 150 may include a microphone 156. The imaging unit 150 supplied with the shutter signal may supply audio information in addition to image information, by recording a sound for a predetermined time. For example, the imaging unit 150 can supply image information including audio information by adding audio information as additional information to image information.

The communication unit 190 is supplied with the image information including the audio information and sends the image information including the audio information to a predetermined address.

<<Positional Information Acquiring Circuit>>

A positional information acquiring circuit 160 can be supplied with the shutter signal and can supply the positional information (see FIG. 1A).

A navigation satellite system (NSS) is used for the positional information acquiring circuit 160, for example. Specifically, the positional information acquiring circuit 160 receives a signal from the global positioning system (GPS) and analyzes it to acquire positional information. Note that the positional information includes numerical values of latitude, longitude, and the like.

Alternatively, the positional information acquiring circuit 160 receives a signal from a wireless local area network (LAN) access point whose position is indicated in advance, and analyzes the kind and the intensity of the signal to acquire positional information.

The positional information acquiring circuit 160 supplies the acquired positional information.

For example, the imaging unit 150 supplied with the positional information may add the positional information as additional information to the image information to supply the image information to which the positional information is added. The communication unit 190 can be supplied with the image information to which the positional information is added and can transmit, to a predetermined address, the image information to which the positional information is added.

Thus, it is possible to transmit, to the communication network, positional information on the location where a user operates the security device either alone or in combination with information including an image of a crime scene and/or information including a message asking for help and to maintain image information useful for confirming the occurrence of the crime. Consequently, a novel security device can be provided. Furthermore, a novel information processing device capable of maintaining information useful for confirming the occurrence of a crime can be provided.

<<Communication Unit>>

The communication unit 190 is supplied with the image information and transmits the image information to the communication network. The communication unit 190 includes a modulator, an amplifier, or the like. It is sufficient that the communication unit 190 can transmit the image information and/or the positional information, and there is no limitation on a mobile telecommunication system to be used. For example, third and subsequent generation of mobile telecommunication systems can be used.

The communication unit 190 includes a storage mechanism that stores an address to which the image information and/or the positional information are/is sent. A user can register an address in advance. For example, a parent, a family member, a school, police, a security company, and/or the like can be set as the destination of transmission of the image information and/or the positional information. Furthermore, such information may be sent to an unspecified number of people by connection to a social networking service.

A user of the security device 100 operates the security device 100 to supply the shutter signal to the imaging unit.

The imaging unit 150 supplied with the shutter signal performs imaging in an emission direction of the pulsed light emitted from the light-emitting element 120.

The imaging unit 150 generates image information and supplies it to the communication unit 190. Note that in the case where positional information, audio information, or the like is supplied to the imaging unit, the positional information, the audio information, or the like is added to the imaging information.

The communication unit 190 is supplied with the image information and sends the image information to the destination of transmission that has been registered in advance.

Note that a series of operations after the control pulse signal is supplied is performed rapidly and automatically by the security device, which prevents interference with the transmission of the image information by an assailant. As a result, the series of operations can be completed before the security device 100 is destroyed or thrown away.

The communication unit 190 may be supplied with the positional information. The communication unit 190 may transmit the supplied positional information either alone or in combination with a predetermined message or the like.

For example, a phone number, a user's name, and a sentence can be set as the predetermined message. Specifically, when the user is a child, a sentence asking his/her parent or the like for help, such as "Help me, mother", can be used. Note that the communication unit 190 includes a memory circuit that stores such a message.

In the case where a plurality of pieces of image information is supplied, the communication unit 190 can transmit the plurality of pieces of image information successively or simultaneously.

The communication unit 190 may have a receiving function. The communication unit 190 can receive an operation instruction transmitted by a person who received information sent by the security device 100. Thus, a person who received the information can control the security device remotely.

Furthermore, in order to reduce power consumed by the security device 100, the security device 100 can transmit only a search and rescue signal intermittently.

Modification Example 1

In a modification example of this embodiment, a modification example of a structure of the security device of one embodiment of the present invention is described with reference to FIG. 3A.

Figure 3A:
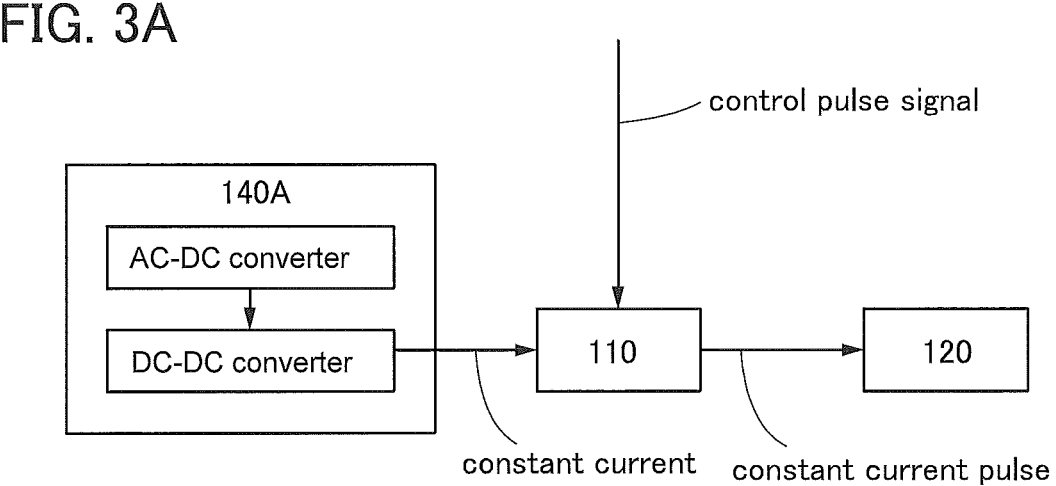
FIGS. 3A to 3C illustrate a block diagram of a structure and a usage state of a security device according to an embodiment.
Figure 3B:
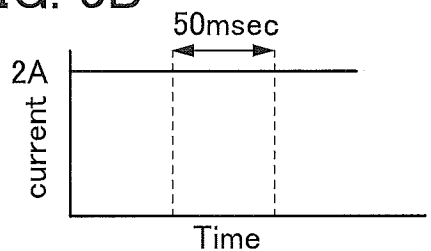
Figure 3C:
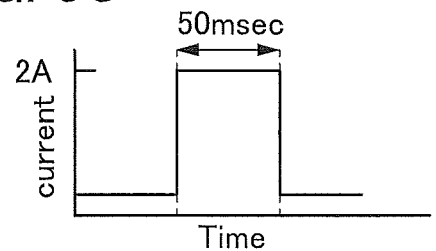

FIGS. 3A to 3C illustrate a structure in which a constant current supply 140A of the modification example of this embodiment supplies constant current to the switching circuit 110.

The constant current supply 140A described in this modification example of this embodiment is different from the constant current supply 140 described with reference to FIGS. 2A and 2D in including an AC-DC converter that converts AC power to DC power. Parts different from those in the constant current supply 140 are described in detail below, and the above description is referred to for the other similar parts.

<<Modification Example of Constant Current Supply>>

The constant current supply 140A includes an AC-DC converter that is supplied with power from an alternating power supply and supplies direct current and a DC-DC converter that is supplied with the direct current.

The AC-DC converter converts power supplied from an alternating power supply such as a lamp line to direct current.

The DC-DC converter is supplied with the direct current, converts the direct current to constant current, and supplies the constant current (see FIG. 3B).

The switching circuit 110 is supplied with the control pulse signal and the constant current and supplies a constant current pulse (see FIG. 3C).

The light-emitting element 120 is supplied with the constant current pulse and emits pulsed light.

Owing to this structure, power can be continuously supplied from a stable power supply such as a lamp line.

Modification Example 2

In a modification example of this embodiment, a modification example of a structure of the security device of one embodiment of the present invention is described with reference to FIGS. 4A and 4B.

Figure 4A:
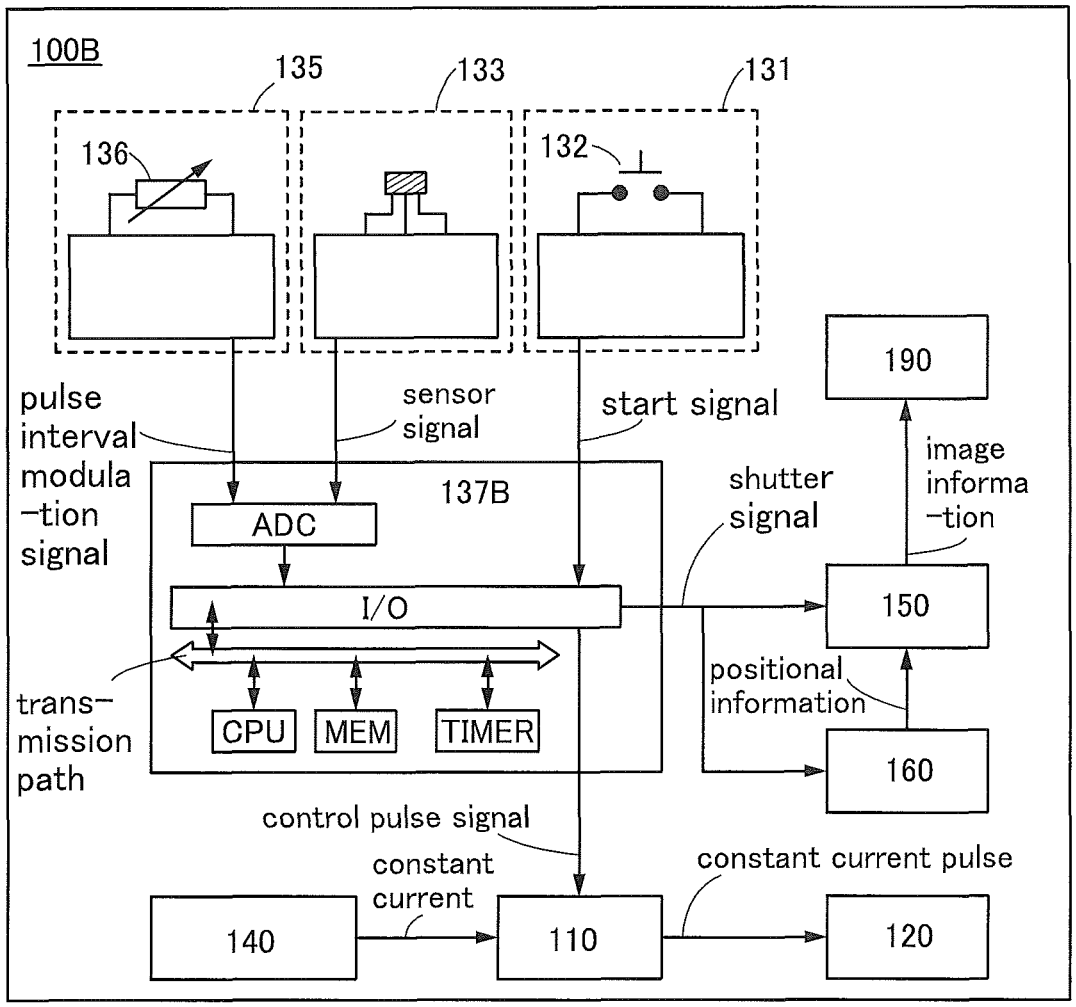
FIGS. 4A and 4B illustrate a block diagram of a structure and a usage state of a security device according to an embodiment.
Figure 4B:
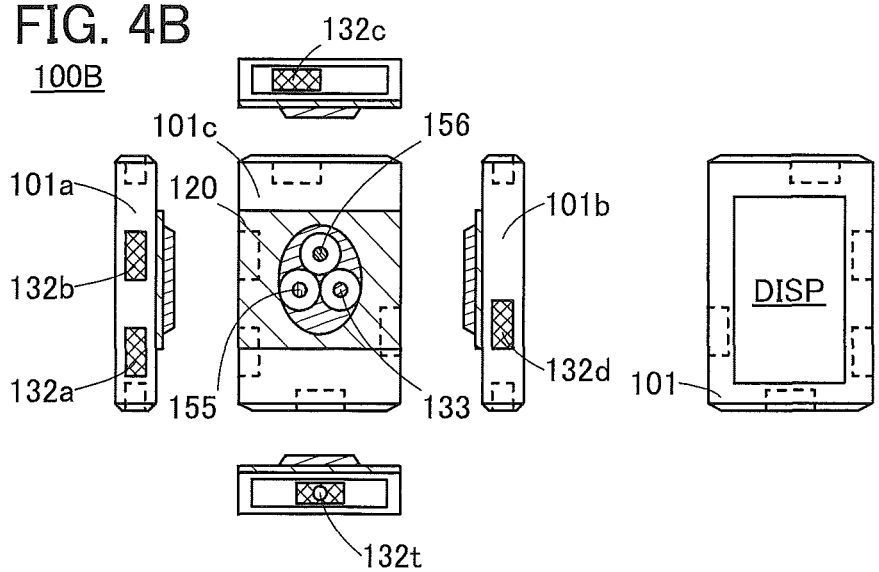

FIG. 4A is a block diagram illustrating a structure of a security device 100B of a modification example of this embodiment. FIG. 4B shows six orthogonal views illustrating the appearance of the security device 100B of the modification example of this embodiment.

Note that the structure of the security device 100B described in the modification example of this embodiment is similar to the structure of the security device 100, except that a human sensor circuit 133 for supplying a sensor signal is provided and a microcontroller 137B is supplied with the sensor signal. Parts different from those in the security device 100 are described in detail below, and the above description is referred to for the other similar parts.

The security device 100B described in the modification example 2 of this embodiment is the security device that includes the human sensor circuit 133 and the microcontroller 137B. The human sensor circuit 133 monitors an emission direction of the pulsed light and supplies the sensor signal. The microcontroller 137B supplies the control pulse signal and the shutter signal when the sensor signal and the start signal are supplied.

The security device 100B includes the human sensor circuit that senses whether a human exists in a direction of light to be emitted by a user. Thus, the pulsed light can be made less likely to be emitted incorrectly in a direction in which a human does not exist. Consequently, a novel security device that is less likely to perform incorrect operation can be provided. Furthermore, a novel information processing device capable of maintaining information useful for confirming the occurrence of a crime can be provided.

Note that a human sensor may be used for the start switch circuit 131. The start switch circuit 131 can be configured to supply a start signal when the switch 132 is operated in a state where the human sensor senses a human.

<<Human Sensor Circuit>>

The human sensor circuit 133 includes a human sensor and supplies the sensor signal by amplifying a signal supplied from the human sensor, for example.

Examples of the human sensor that can be used for the human sensor circuit 133 include an element that senses infrared rays, ultrasonic waves, microwaves, visible light, or the like.

Specifically, a pyroelectric element, a photodiode, or the like can be used. Furthermore, the human sensor can be formed using a CCD camera, a CMOS camera, or the like that supplies image information or using an image analysis device that analyzes supplied image information.

A combination of an ultrasonic transmitter, a piezoelectric element, and the like or a combination of a microwave transmitter, an antenna, and the like may be used.

The human sensor is provided so that the directivity of the human sensor matches an emission direction of light from the light-emitting element 120. Specifically, the human sensor is provided for one surface 101c of the housing 101 so as to be adjacent to the light-emitting element 120. Thus, the human sensor is easily made to face in an emission direction of the pulsed light.

<<Microcontroller>>

The memory unit MEM of the microcontroller 137B stores a program for making the arithmetic unit CPU execute a step of performing analog/digital conversion on a supplied sensor signal and a step of supplying the control pulse signal when the sensor signal exceeds a predetermined threshold level and the start signal is supplied.

This embodiment can be combined with any of the other embodiments in this specification as appropriate.

Embodiment 2

In this embodiment, a structure of a security device of one embodiment of the present invention is described with reference to FIG. 5.

Figure 5:
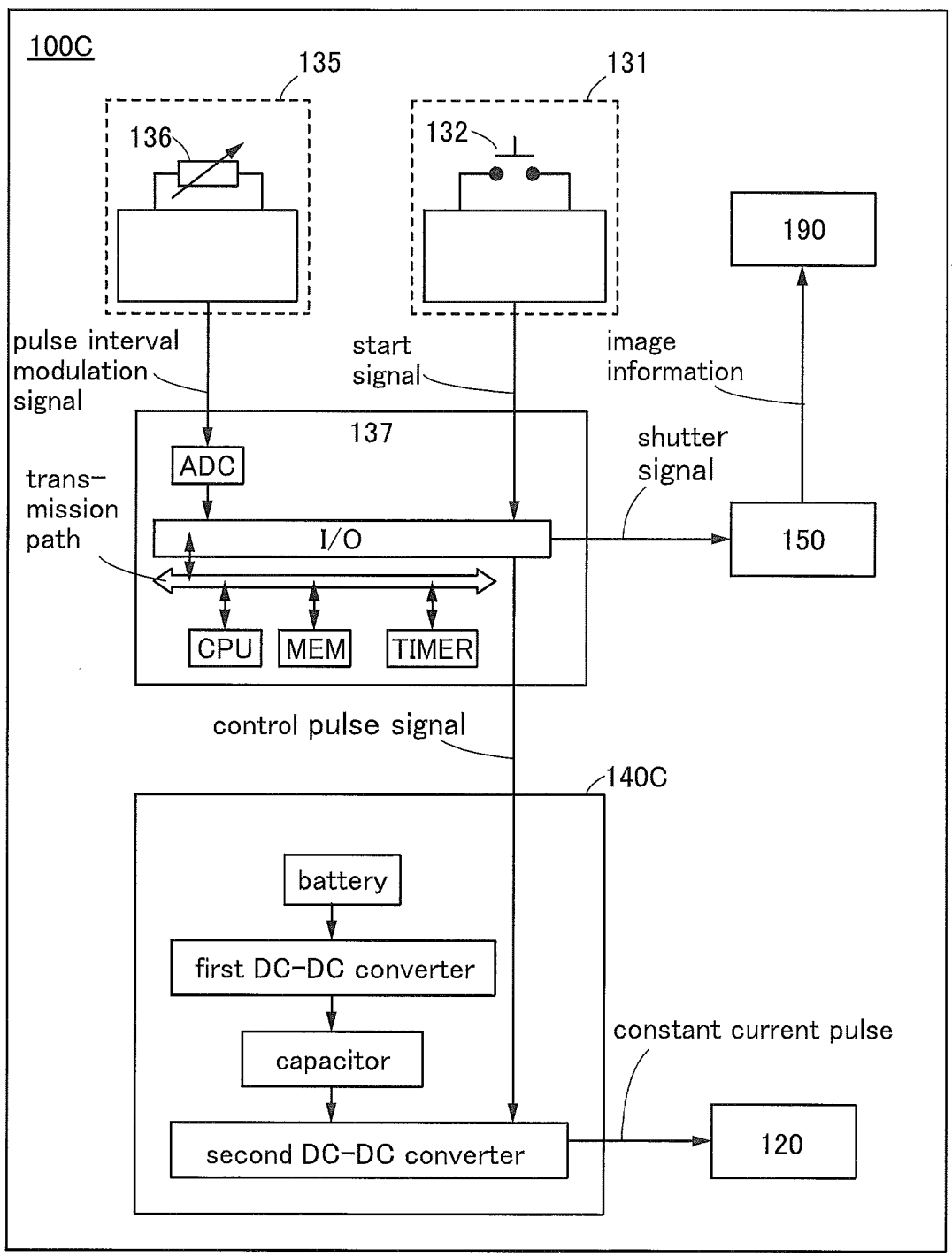
FIG. 5 is a block diagram illustrating a structure of a security device according to an embodiment.

FIG. 5 is a block diagram illustrating a structure of a security device 100C of one embodiment of the present invention.

Note that a structure of the security device 100C described in this embodiment is the same as that of the security device 100 described in Embodiment 1 except that a constant current supply 140C is supplied with the control pulse signal and supplies the constant current pulse and that a switching circuit is not included.

The security device 100C described in this embodiment includes the housing 101, the switch 132 that is provided so as to be operable with a hand that holds the housing 101, and the start switch circuit 131 that includes the switch 132 and supplies the start signal when the switch 132 is operated.

The security device 100C includes the microcontroller 137 that is supplied with the start signal and supplies the control pulse signal and the shutter signal, the constant current supply 140C that is supplied with the control pulse signal and supplies the constant current pulse, and the light-emitting element 120 that is supplied with the constant current pulse and emits pulsed light to the outside of the housing.

The security device 100C includes the imaging unit 150 that is supplied with the shutter signal, performs imaging in an emission direction of the pulsed light, and supplies the image information; and the communication unit 190 that transmits the image information to the communication network.

The security device 100C of one embodiment of the present invention includes the switch 132 that is provided so as to be operable with a hand that holds the housing 101, the light-emitting element 120 that emits pulsed light in accordance with the operation of the switch 132, the imaging unit 150 that performs imaging in an emission direction of the pulsed light and supplies image information, and the communication unit 190 that transmits the image information to the communication network. With the use of the security device having such a structure by a user, the pulsed light can be emitted to an assailant, which prevents crimes. Furthermore, information including an image of a crime scene can be transmitted to the communication network. Consequently, a novel security device can be provided. Furthermore, a novel information processing device that can maintain information useful for confirming the occurrence of a crime can be provided.

The security device 100C described in this embodiment includes the pulse interval modulation circuit 135. The pulse interval modulation circuit 135 includes the variable resistor 136 and supplies the pulse interval modulation signal.

<Security Device>

A structure of the constant current supply 140C is described.

<<Constant Current Supply>>

The constant current supply 140C includes the battery for supplying the first voltage, the first DC-DC converter that is supplied with the first voltage and supplies the second voltage higher than the first voltage, the capacitor that is supplied with the second voltage and supplies the electric charge, and the second DC-DC converter that can be supplied with the control pulse signal and the electric charge and supply the constant current pulse (see FIG. 5).

The structure of the constant current supply 140C is the same as that of the constant current supply 140 described in Embodiment 1 except that the second DC-DC converter is supplied with the control pulse signal.

The second DC-DC converter is supplied with the control pulse signal and the electric charge stored in the capacitor, and supplies the constant current pulse when the control pulse signal is at a high level.

With this structure, the second DC-DC converter can supply the constant current pulse while the capacitor supplies the electric charge to the second DC-DC converter. Note that when the electric charge stored in the capacitor is less than a predetermined level, the second DC-DC converter cannot supply the constant current pulse.

The constant current supply 140C can supply the constant current pulse for a period at least longer than the width of the control pulse signal (e.g., 50 milliseconds) supplied by the microcontroller 137.

This embodiment can be combined with any of the other embodiments in this specification as appropriate.

Embodiment 3

In this embodiment, structures of information processing devices of one embodiment of the present invention are described with reference to FIG. 6 and FIGS. 7A to 7C.

Figure 6:
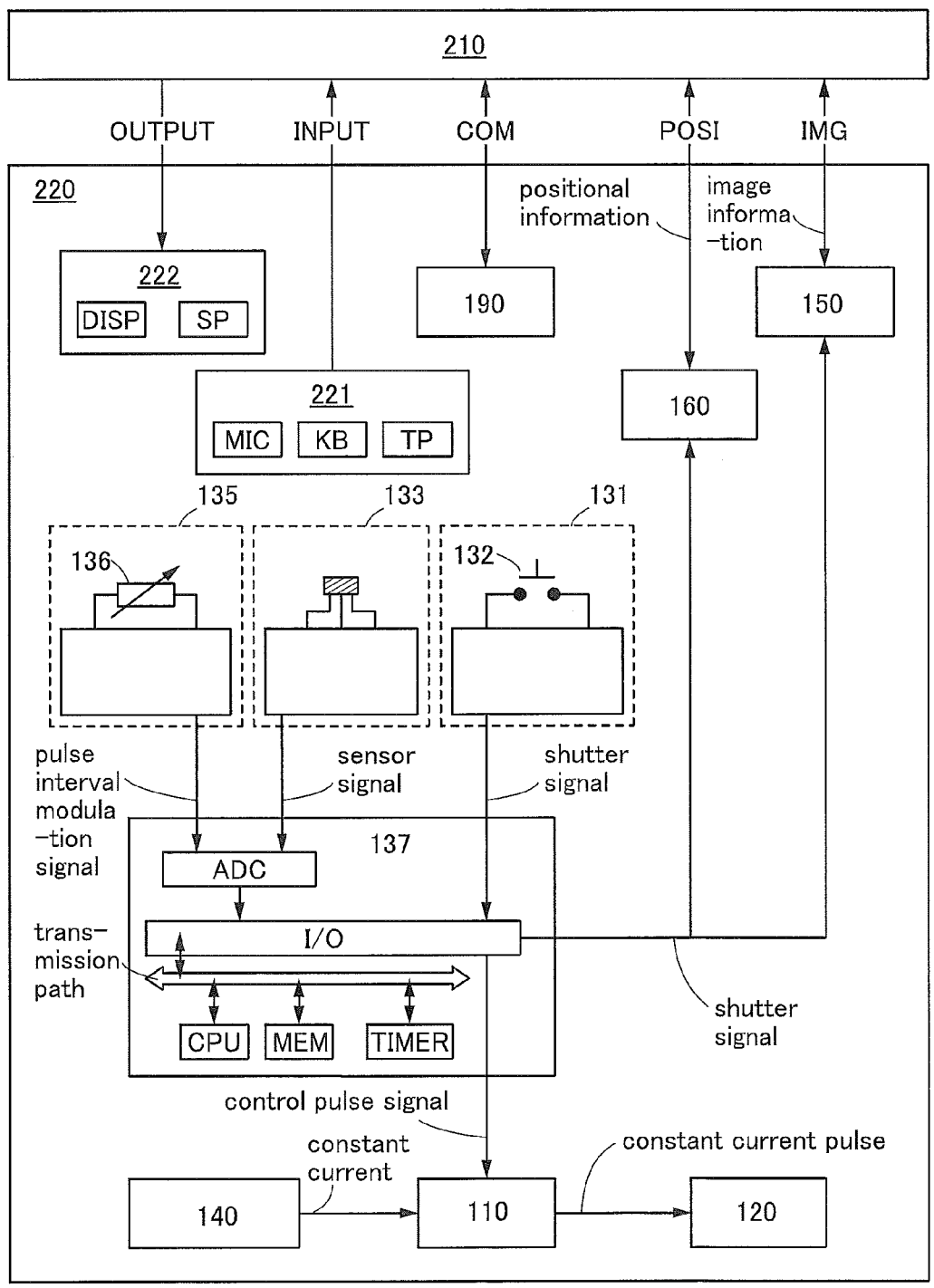
FIG. 6 is a block diagram illustrating a structure of an information processing device according to an embodiment.

FIG. 6 is a block diagram illustrating a structure of an information processing device 200 of one embodiment of the present invention.

Figure 7A:
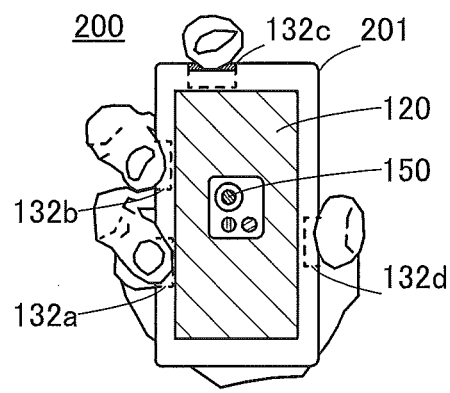
FIGS. 7A to 7C are external views illustrating outside shapes of an information processing device according to an embodiment.
Figure 7B:
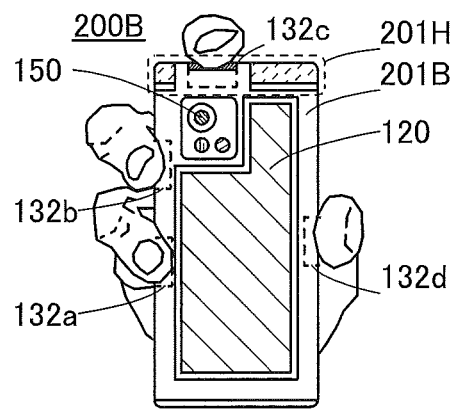
Figure 7C:
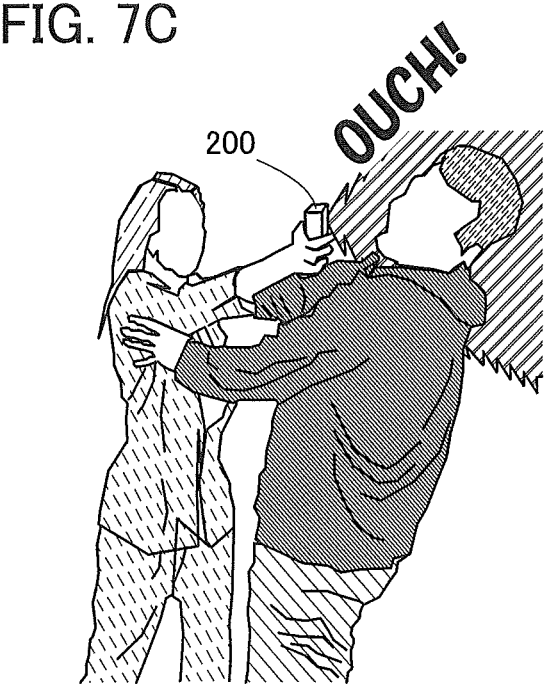

FIGS. 7A to 7C are external views illustrating outside shapes and a usage state of information processing devices of one embodiment of the present invention. FIG. 7A shows an outside shape of the information processing device 200. FIG. 7B shows an outside shape of an information processing device 200B. FIG. 7C is an external view illustrating a usage state of the information processing device 200.

The information processing device 200 described in this embodiment includes an arithmetic unit 210 and an input/output unit 220. The arithmetic unit 210 is configured to be supplied with positional information POSI and image information IMG. The input/output unit 220 includes an input mechanism 221 and an output mechanism 222 including a display unit DISP. Except these, the structure of the information processing device 200 is the same as that of the security device 100B described in the modification example 2 of Embodiment 1.

The information processing device 200 described in this embodiment includes the arithmetic unit 210 that is supplied with the image information IMG, the positional information POSI, and the operation instruction INPUT and supplies communication information COM and output information OUTPUT including display information. The information processing device 200 described in this embodiment further includes the input/output unit 220 that is supplied with the communication information COM and the output information OUTPUT including the display information and supplies the image information IMG, the positional information POSI, and the operation instruction INPUT (see FIG. 6).

The information processing device 200 includes a housing 201 in which the arithmetic unit 210 and the input/output unit 220 are installed (see FIGS. 7A to 7C).

The input/output unit 220 of the information processing device 200 includes the switch 132 that is provided so as to be operable with a hand that holds the housing 201, and the start switch circuit 131 that includes the switch 132 and supplies the start signal when the switch 132 is operated.

In particular, the start switch circuit 131 is preferably configured to supply the start signal when a plurality of switches is operated. The plurality of switches (the switch 132a, the switch 132b, the switch 132c, and the switch 132d) is provided for side surfaces of the housing 201 (see FIGS. 7A to 7C).

The information processing device 200 includes the microcontroller 137 that is supplied with the start signal and supplies the control pulse signal and the shutter signal, the switching circuit 110 that is supplied with the control pulse signal and the constant current and supplies the constant current pulse, the constant current supply 140 that supplies the constant current, and the light-emitting element 120 that is supplied with the constant current pulse and emits pulsed light to the outside of the housing 201.

The information processing device 200 includes the imaging unit 150 that is supplied with the shutter signal, performs imaging in an emission direction of the pulsed light, and supplies the image information IMG; the positional information acquiring circuit 160 that can be supplied with the shutter signal and supply the positional information POSI; and the communication unit 190 that transmits the communication information COM to the communication network.

The information processing device 200 includes the input mechanism 221 that supplies the operation instruction INPUT and the display unit DISP that is supplied with the output information OUTPUT including the display information and displays the display information.

The communication unit 190 transmits the image information IMG to the communication network.

The information processing device 200 of this embodiment includes the switch 132 that is provided so as to be operable with a hand that holds the housing 201, the light-emitting element 120 that emits pulsed light in accordance with the operation of the switch 132, the imaging unit 150 that performs imaging in an emission direction of the pulsed light and supplies the image information IMG, and the communication unit 190 that transmits the image information IMG to the communication network. With the use of the security device having such a structure by a user, the pulsed light can be emitted to an assailant, which prevents crimes. Furthermore, information including an image of a crime scene can be transmitted to the communication network. Furthermore, a photograph can be taken. Consequently, a novel information processing device that can maintain information useful for confirming the occurrence of a crime can be provided.

The information processing device 200 can emit light toward an assailant to repulse the assailant but also take an image of the assailant (see FIG. 7C). This can prevent crimes. Even when a crime occurs, the image makes it easy to identify a criminal.

The information processing device 200 described in this embodiment includes the pulse interval modulation circuit 135. The pulse interval modulation circuit 135 includes the variable resistor 136 and supplies the pulse interval modulation signal.

<Information Processing Device>

The following describes components included in the information processing device 200.

Note that parts different from those in the structure of the security device 100B described in the modification example 2 of Embodiment 1 are described in detail below, and the above description is referred to for the other similar parts.

<<Arithmetic Unit and Input/Output Unit>>

The arithmetic unit 210 is supplied with the image information IMG, the positional information POSI, and the operation instruction INPUT and supplies the communication information COM and the output information OUTPUT including the display information.

The input/output unit 220 is supplied with the communication information COM and the output information OUTPUT including the display information and supplies the image information IMG, the positional information POSI, and the operation instruction INPUT.

The arithmetic unit 210 includes an arithmetic circuit, a memory unit for storing a program to be executed by the arithmetic circuit, a transmission path, an input/output interface, and the like.

The input/output unit 220 includes the start switch circuit 131, the switch 132, the microcontroller 137, the switching circuit 110, the light-emitting element 120, the constant current supply 140, the imaging unit 150, the positional information acquiring circuit 160, the communication unit 190, the input mechanism 221, the output mechanism 222, and the like.

<<Input Mechanism>>

A mechanism for supplying information to the information processing device 200 can be used for the input mechanism 221.

Examples of a mechanism for supplying the operation instruction to the information processing device 200 by a user of the information processing device 200 are a microphone MIC, a keyboard KB, and a touch panel TP.

Specifically, a user can supply audio information using the microphone MIC. The arithmetic unit 210 can convert the audio information to an analog signal or a digital signal and supply the converted audio information. The communication unit 190 can supply the converted audio information with or without wire. The communication network can supply the audio information to a remote place, for example.

The start switch circuit may be configured to supply the start signal when the input/output mechanism is used by a user who is not authorized to use the input/output mechanism. Specifically, an instruction may be supplied to the communication unit 190 of the stolen information processing device 200 through a communication network, and when information is supplied from the input/output mechanism, the start switch circuit 131 may supply the start signal.

The start switch circuit 131 may be configured to supply the start signal when a picture of a person who uses the input/output mechanism is taken by the imaging unit 150 and the person is identified as a person who is not authorized to use the input/output mechanism.

<<Output Mechanism>>

A mechanism for supplying information by a method by which a user of the information processing device 200 can perceive the information is used for the output mechanism 222.

For example, in the case where the output information OUTPUT including the audio information and/or the image information is supplied to the output mechanism 222, a speaker SP can be used for the output mechanism 222 so that the audio information can be acquired by the user of the information processing device 200 through the sense of hearing. Furthermore, the display unit DISP or the like can be used for the output mechanism 222 so that the display information can be acquired through the sense of sight.

For example, a display panel including a plurality of display elements arranged in a matrix can be used for the display unit DISP. Specifically, a liquid crystal display panel, an organic EL panel, electronic paper, or the like can be used for the display unit DISP.

One information processing device 200 can acquire the audio information supplied from the other information processing device, through the communication network.

The communication unit 190 acquires the audio information supplied from the communication network and supplies the information COM including the audio information. The arithmetic unit 210 supplies the output information OUTPUT including the audio information. The speaker SP plays back the audio information.

With such a structure, a user of the information processing device 200 can acquire the audio information supplied from the remote place by playing it back. Thus, the information processing device 200 can be used as a mobile phone.

<<Housing>>

The housing 201 has a flat-plate-like shape, and the switch 132*a*, the switch 132*b*, the switch 132*c*, and the switch 132*d* are provided for the side surfaces of the housing 201 (FIG. 7A).

The imaging unit 150 and the light-emitting element 120 surrounding the imaging unit 150 are provided for a large surface of the housing 201. The information processing device 200 using the housing 201 can be used as a smartphone, for example.

A housing 201B has a hinge 201H and can be folded in two. The switch 132*a*, the switch 132*b*, the switch 132*c*, and the switch 132*d* are provided for side surfaces of the housing 201B (FIG. 7B).

The imaging unit 150 and the light-emitting element 120 surrounding the imaging unit 150 are provided for a large surface of the housing 201. The information processing device 200 using the housing 201B can be used as a mobile phone, for example.

This embodiment can be combined with any of the other embodiments in this specification as appropriate.

Embodiment 4

In this embodiment, a structure of a light-emitting panel that can be used for the light-emitting device of one embodiment of the present invention is described with reference to FIGS. 8A and 8B, FIGS. 9A and 9B FIGS. 10A and 10B, and FIGS. 11A to 11C.

The light-emitting device of one embodiment of the present invention can be used as, for example, a camera flash. As a camera flash decreases in size, the shape of its light-emitting portion becomes more linear or point-like. Since light from a light source travels in a straight line, a smaller light source casts a sharper shadow of an object. Thus, when a photograph of a human face is taken in a dark place using a flash, for example, a shadow of a nose might be cast on a cheek.

In addition, when the intensity of a flash is excessively high, a portion having different brightness in reality might become uniformly white in a photograph (i.e., blown-out highlights) in some cases. In contrast, when the intensity of a flash is too low, a dark portion of a photograph might become uniformly black (i.e., blocked up shadows) in some cases. Thus, a flash is preferably capable of adjusting the amount of light depending on an environment and the condition of a photographic subject.

In view of the above, a light-emitting element that is a planar light source is used for a light-emitting panel in one embodiment of the present invention. For example, with the use of an organic EL element, a thin and large-area element can be formed easily. When a planar light source, a point light source, and a line light source emit the same amount of light, the planar light source can have a smaller amount of light per unit area or a shorter emission time than the point light source and the line light source. Thus, the amount of heat generation per unit area can be reduced. In addition, the planar light source releases heat easily because of its large light-emitting area. Thus, deterioration due to local heat generation of the light-emitting panel can be suppressed. A light-emitting device that has higher reliability and less deterioration of a light-emitting panel than a light-emitting device including a light-emitting diode using an inorganic material, or the like can be provided.

The light-emitting panel can be thinner and lighter in the case of using an organic EL element than in the case of using a conventional xenon lamp or the like. Heat generated by light emission is diffused over a large area in the light-emitting panel and is therefore released efficiently. Thus, heat accumulation in the light-emitting panel is suppressed; and, deterioration of the light-emitting panel is suppressed.

In the case where the light-emitting panel is a planar light source, a shadow is less likely to be cast on a photographic subject even when the light-emitting device of one embodiment of the present invention is used as a camera flash.

The light-emitting panel can be configured to emit white light by using a properly selected light-emitting organic compound. For example, a plurality of light-emitting organic compounds that emit light of complementary colors can be used. Alternatively, three kinds of light-emitting organic compounds that emit light of red, green, and blue can be used. Furthermore, different emission spectra can be selected from a variety of organic compounds. Accordingly, the light-emitting device having excellent white balance can be obtained.

By using a light-emitting organic compound, an emission spectrum can be broadened as compared to that of a light-emitting diode with an inorganic material. Light having a broad emission spectrum is close to natural light and suitable for photography.

An example of a structure of a light-emitting panel in which an organic EL element is used as a light-emitting element is described below.

<<Structure Example 1 of Light-Emitting Panel>>

Figure 8A:
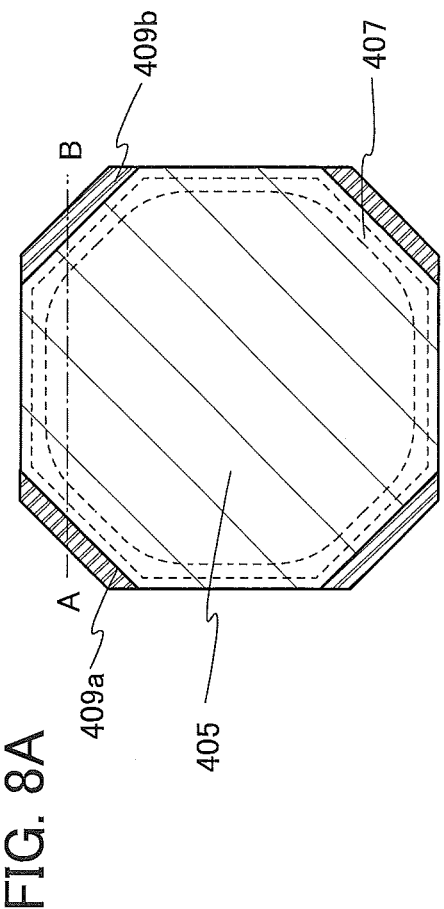
FIGS. 8A and 8B illustrate a light-emitting panel.
Figure 8B:
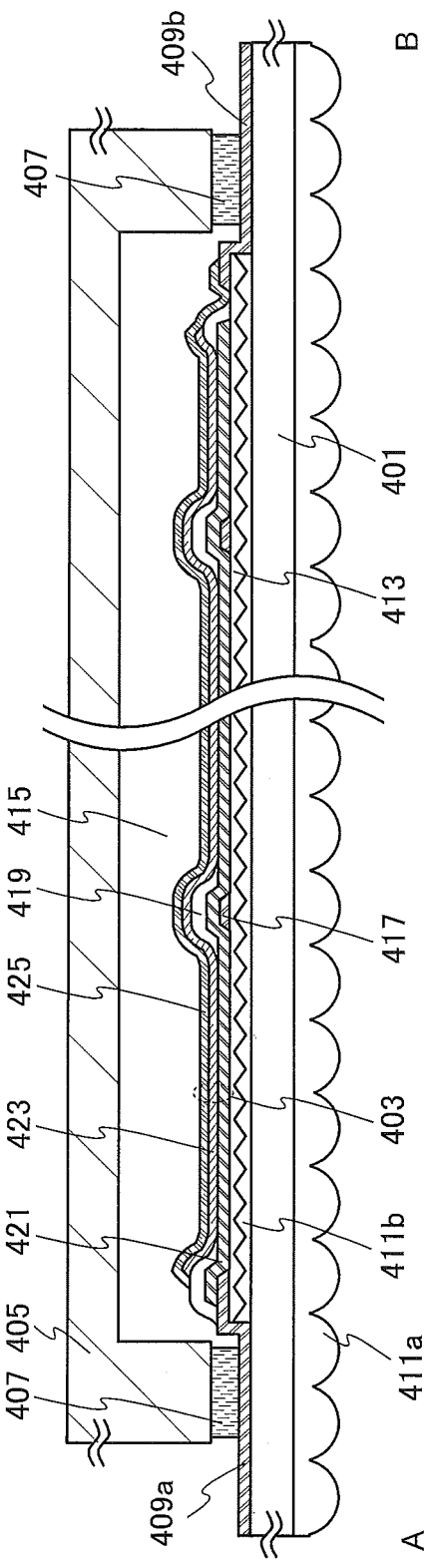

FIG. 8A is a plan view illustrating a light-emitting panel of one embodiment of the present invention, and FIG. 8B is a cross-sectional view taken along the dashed-dotted line A-B in FIG. 8A.

In the light-emitting panel illustrated in FIGS. 8A and 8B, the light-emitting element 403 is provided in a space 415 surrounded by the support substrate 401, a sealing substrate 405, and a sealant 407. The light-emitting element 403 is an organic EL element having a bottom-emission structure; specifically, the first electrode 421 that transmits visible light is provided over the support substrate 401, the EL layer 423 is provided over the first electrode 421, and the second electrode 425 that reflects visible light is provided over the EL layer 423.

The structure of the light-emitting element used in one embodiment of the present invention is not limited to the bottom-emission structure and may be, for example, a top-emission structure.

A first terminal 409a is electrically connected to an auxiliary wiring 417 and the first electrode 421. An insulating layer 419 is provided over the first electrode 421 in a region overlapping the auxiliary wiring 417. The first terminal 409a is electrically insulated from the second electrode 425 by the insulating layer 419. A second terminal 409b is electrically connected to the second electrode 425. Note that although the first electrode 421 is formed over the auxiliary wiring 417 in this embodiment, the auxiliary wiring 417 may be faulted over the first electrode 421.

An outcoupling structure 411a is preferably provided at the interface between the support substrate 401 and the atmosphere. When provided at the interface between the support substrate 401 and the atmosphere, the outcoupling structure 411a can reduce light that cannot be extracted to the atmosphere because of total reflection, resulting in increased light extraction efficiency of the light-emitting panel.

In addition, an outcoupling structure 411b is preferably provided between the light-emitting element 403 and the support substrate 401. In the case where the outcoupling structure 411b has unevenness, a planarization layer 413 is preferably provided between the outcoupling structure 411b and the first electrode 421. This enables the first electrode 421 to be a flat film, and generation of leakage current in the EL layer 423 due to the unevenness of the first electrode 421 can be prevented. In addition, because of the outcoupling structure 411b at the interface between the planarization layer 413 and the support substrate 401, light that cannot be extracted to the atmosphere due to total reflection can be reduced, so that the light extraction efficiency of the light-emitting panel can be increased.

As a material of the outcoupling structure 411a and the outcoupling structure 411b, a resin can be used, for example. Alternatively, for the outcoupling structure 411a and the outcoupling structure 411b, a hemispherical lens, a micro lens array, a film provided with an uneven surface structure, a light diffusing film, or the like can be used. For example, the outcoupling structure 411a and the outcoupling structure 411b can be formed by attaching the lens or film to the support substrate 401 with an adhesive or the like having substantially the same refractive index as the support substrate 401 or the lens or film.

The surface of the planarization layer 413 that is in contact with the first electrode 421 is flatter than the surface of the planarization layer 413 that is in contact with the outcoupling structure 411b. As a material of the planarization layer 413, a material with a light-transmitting property and a high refractive index (e.g., glass, a resin, or a liquid substance such as a refractive index liquid) can be used.

Note that the light-emitting panel of one embodiment of the present invention is not necessarily provided with any light extraction structure. In that case, the second electrode that reflects visible light can be used as a mirror, which is preferable.

<<Structure Example 2 of Light-Emitting Panel>>

Figures 9A, 9B:
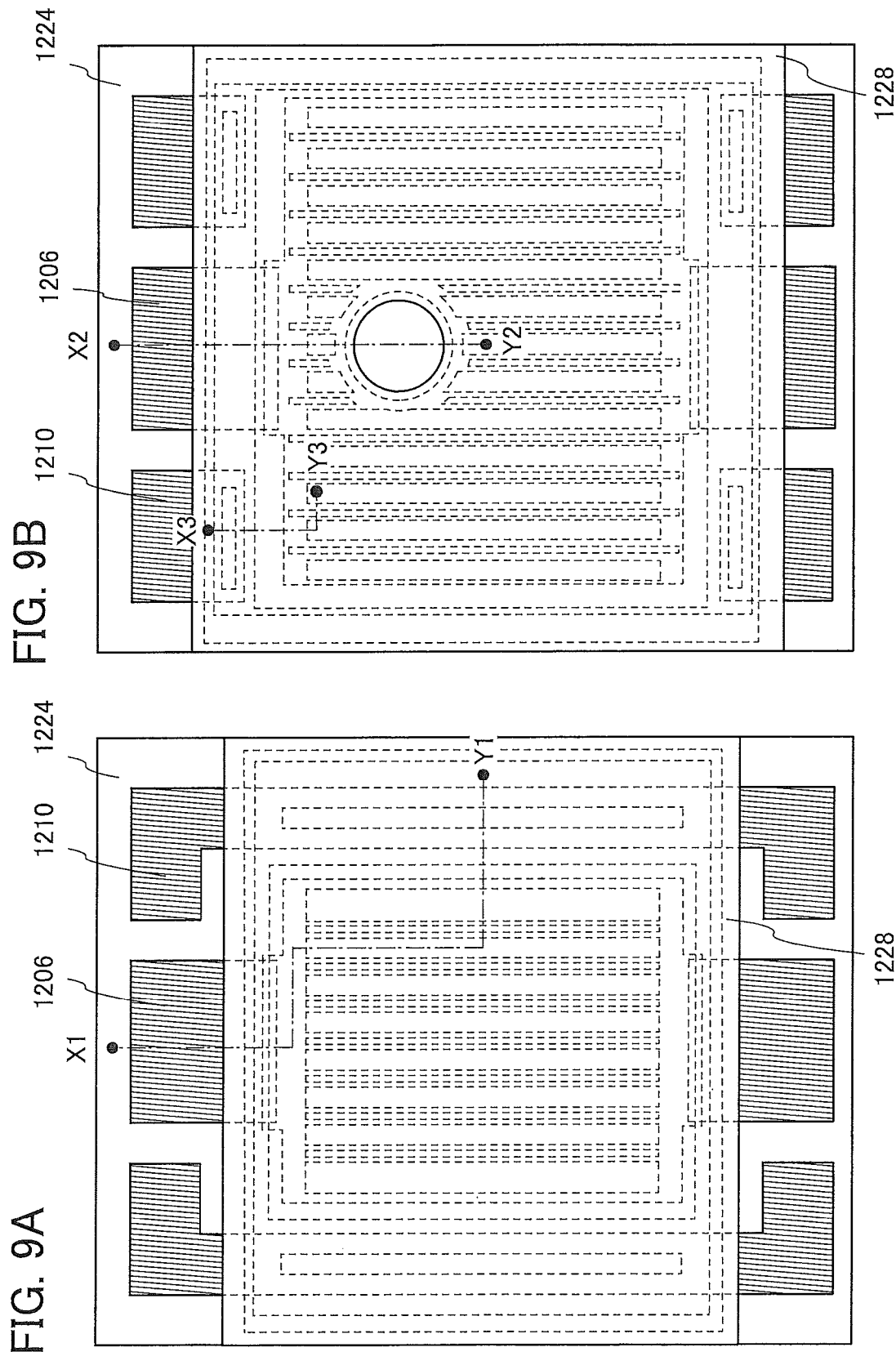
FIGS. 9A and 9B each illustrate a light-emitting panel.

FIG. 9A is a plan view illustrating a light-emitting panel of one embodiment of the present invention, and FIGS. 10A and 10B are each a cross-sectional view taken along the dashed-dotted line X1-Y1 in FIG. 9A.

In the light-emitting panel illustrated in FIG. 10A, a light-emitting element 1250 is provided over a support substrate 1220 with an insulating film 1224 therebetween. The auxiliary wiring 1206 is provided over the insulating film 1224 and is electrically connected to the first electrode 1201. The auxiliary wiring 1206 is partly exposed and functions as a terminal. An end portion of the first electrode 1201 and an end portion of a conductive layer 1210 are covered with a partition wall 1205. In addition, the partition wall 1205 is provided to cover the auxiliary wiring 1206 with the first electrode 1201 therebetween. The light-emitting element 1250 is sealed with the support substrate 1220, a sealing substrate 1228, and a sealant 1227. An outcoupling structure 1209 is attached to the surface of the support substrate 1220. A flexible light-emitting panel can be obtained by using flexible substrates as the support substrate 1220 and the sealing substrate 1228.

The light-emitting element 1250 is an organic EL element having a bottom-emission structure; specifically, the first electrode 1201 transmitting visible light is provided over the support substrate 1220, an EL layer 1202 is provided over the first electrode 1201, and a second electrode 1203 reflecting visible light is provided over the EL layer 1202.

In the light-emitting panel illustrated in FIG. 10B, a support substrate 1229 having an outcoupling structure is provided instead of the support substrate 1220 and the outcoupling structure 1209 of the light-emitting panel illustrated in FIG. 10A. The support substrate 1229 has both a function as a support and a function of improving the light extraction efficiency of the light-emitting panel.

As methods for forming a light-emitting element over a flexible substrate in the case of fabricating a flexible light-emitting panel, there are methods such as a first method in which the light-emitting element is directly formed over a flexible substrate, and a second method in which the light-emitting element is formed over a highly heat-resistant substrate (hereinafter referred to as a formation substrate) that is different from a flexible substrate and the light-emitting element is then separated from the formation substrate and transferred to the flexible substrate.

When a substrate that is resistant to heat applied in the process of forming the light-emitting element, such as a glass substrate thin enough to have flexibility, is used, the first method is preferably employed, in which case the process can be simplified.

When the second method is employed, an insulating film with low water permeability or the like that is formed over a formation substrate can be transferred to a flexible substrate. Thus, even when an organic resin with high water permeability and low heat resistance or the like is used as a material of the flexible substrate, a flexible light-emitting panel with high reliability can be fabricated.

<<Structure Example 3 of Light-Emitting Panel>>

Figure 11A:
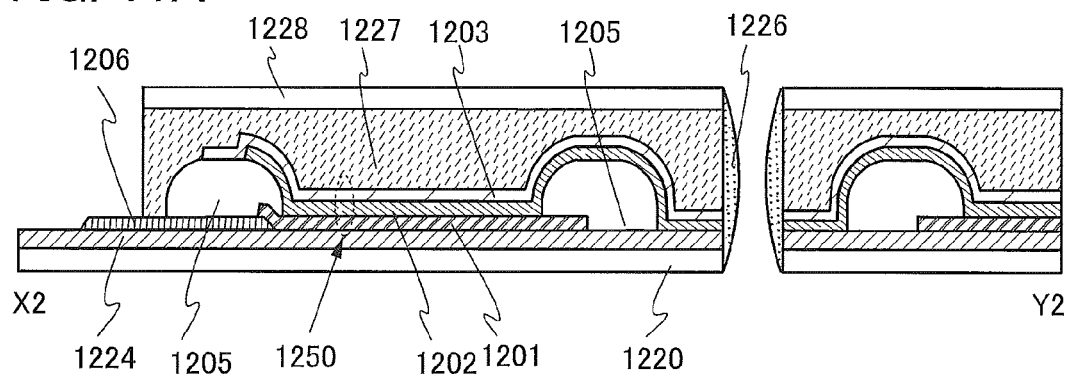
FIGS. 11A to 11C each illustrate a light-emitting panel.
Figure 11B:
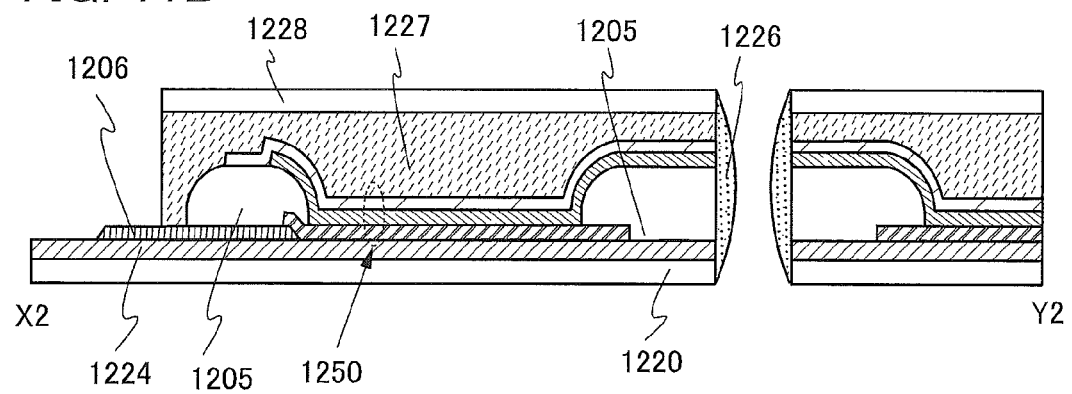
Figure 11C:
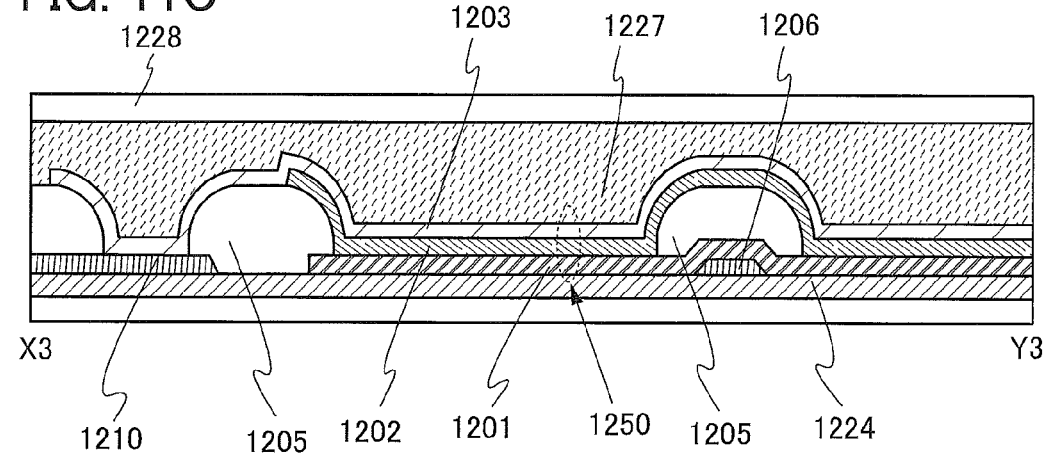

FIG. 9B is a plan view of a light-emitting panel of one embodiment of the present invention. FIGS. 11A and 11B are cross-sectional views taken along the dashed-dotted line X2-Y2 in FIG. 9B, which illustrate examples of cross-sectional structures. FIG. 11C is a cross-sectional view taken along the dashed-dotted line X3-Y3 in FIG. 9B.

The light-emitting panels illustrated in FIGS. 11A to 11C are different from the light-emitting panels described in Structure example 2 in that openings are provided in parts of the light-emitting panels. Here, only different components are described in detail, and the description of the light-emitting panels in Structure example 2 can be referred to for the common components.

As illustrated in FIGS. 11A and 11B, the light-emitting panel preferably includes a sealant 1226 in the opening to prevent an electrode or an EL layer from being exposed. Specifically, an opening is formed in the light-emitting panel, and then the sealant 1226 is formed to cover at least an exposed electrode and an exposed EL layer. The sealant 1226 may be the same material as or a different material from the sealant 1227.

FIG. 11A illustrates an example of an opening formed in a region where the partition wall 1205 is not provided. FIG. 11B illustrates an example of an opening formed in a region where the partition wall 1205 is provided.

A light-emitting panel is fabricated in the above-described manner, and a camera lens is provided to overlap the opening, whereby a light-emitting portion can be provided around the camera lens. The light-emitting portion can be used as a camera flash.

Note that an outcoupling structure may be provided on a surface of the substrate.

<<Material of Light-Emitting Panel>>

Examples of materials that can be used for the light-emitting panel of one embodiment of the present invention are described.

[Substrate]

The substrate on the side from which light from the light-emitting element is extracted is formed using a material that transmits the light. For example, a material such as glass, quartz, ceramics, sapphire, or an organic resin can be used.

The weight and thickness of the light-emitting panel can be decreased by using a thin substrate. Furthermore, a flexible light-emitting panel can be obtained by using a substrate that is thin enough to have flexibility. The flexible light-emitting panel can be stored folded when not in use. The flexible light-emitting panel can be used as a lighting device that emits a flash light over a large area, as an alternative to a board reflector that can be used in a photography studio. Alternatively, a foldable lighting device can be provided.

Examples of glass include alkali-free glass, barium borosilicate glass, and aluminoborosilicate glass.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and a light-emitting panel using this substrate can also be lightweight accordingly.

Since the substrate through which light emission is not extracted does not need to have a light-transmitting property, a metal substrate using a metal material or an alloy material or the like can be used as well as the above-described substrates. A metal material and an alloy material, which have high thermal conductivity, are preferably used, in which case heat can be conducted to the whole sealing substrate, so that a local temperature rise in the light-emitting panel can be prevented. To obtain flexibility and bendability, the thickness of a metal substrate is preferably greater than or equal to 10 μm and less than or equal to 200 μm, more preferably greater than or equal to 20 μm and less than or equal to 50 μm.

Although there is no particular limitation on a material of the metal substrate, it is preferable to use, for example, aluminum, copper, nickel, a metal alloy such as an aluminum alloy or stainless steel.

It is preferable to use a substrate subjected to insulation treatment in such a manner that a surface of the conductive substrate is oxidized or an insulating film is formed on the surface. An insulating film may be formed by, for example, a coating method such as a spin-coating method or a dipping method, an electrodeposition method, an evaporation method, or a sputtering method. An oxide film may be formed on the substrate surface by exposure to or heating in an oxygen atmosphere or by an anodic oxidation method or the like.

The flexible substrate may have a stacked structure of a layer of any of the above-mentioned materials and a hard coat layer (e.g., a silicon nitride layer) that protects a surface of the light-emitting panel from damage or the like, a layer (e.g., an aramid resin layer) that can disperse pressure, or the like. Furthermore, to suppress a decrease in the lifetime of the light-emitting element due to moisture and the like, an insulating film with low water permeability may be provided. For example, a film containing nitrogen and silicon (e.g., a silicon nitride film, a silicon oxynitride film) or a film containing nitrogen and aluminum (e.g., an aluminum nitride film) may be provided.

The substrate may be formed by stacking a plurality of layers. When a glass layer is used, a barrier property against water and oxygen can be improved and thus a reliable light-emitting panel can be provided.

A substrate in which a glass layer, an adhesive layer, and an organic resin layer are stacked from the side closer to a light-emitting element can be used. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. With such an organic resin layer provided on an outer side of the glass layer, breakage or a crack of the glass layer can be inhibited, resulting in increased mechanical strength. With the substrate that includes such a composite material of a glass material and an organic resin, a highly reliable and flexible light-emitting panel can be provided.

[Insulating Film]

An insulating film may be provided between the support substrate and the light-emitting element. As the insulating film, an inorganic insulating film such as a silicon oxide film, a silicon nitride film, a silicon oxynitride film, or a silicon nitride oxide film can be used. In order to suppress the entrance of moisture or the like into the light-emitting element, an insulating film with low water permeability such as a silicon oxide film, a silicon nitride film, or an aluminum oxide film is particularly preferable. For a similar purpose and with a similar material, an insulating film covering the light-emitting element may be provided.

[Partition Wall]

For the partition wall, an organic resin or an inorganic insulating material can be used. As the organic resin, for example, a polyimide resin, a polyamide resin, an acrylic resin, a siloxane resin, an epoxy resin, or a phenol resin can be used. As the inorganic insulating material, silicon oxide, silicon oxynitride, or the like can be used. In particular, a photosensitive resin is preferably used for easy formation of the partition wall.

There is no particular limitation on the method for forming the partition wall. A photolithography method, a sputtering method, an evaporation method, a droplet discharging method (e.g., an inkjet method), a printing method (e.g., a screen printing method or an offset printing method), or the like can be used.

[Auxiliary Wiring]

The auxiliary wiring is not necessarily provided; however, the auxiliary wiring is preferably provided because voltage drop due to the resistance of an electrode can be prevented.

For the auxiliary wiring, a single layer or a stacked layer using a material selected from copper (Cu), titanium (Ti), tantalum (Ta), tungsten (W), molybdenum (Mo), chromium (Cr), neodymium (Nd), scandium (Sc), or nickel (Ni) or an alloy material including any of these materials as its main component is used. Aluminum can also be used as a material of the auxiliary wiring, and in that case, in order to prevent the problem of corrosion, a stacked layer is formed and aluminum is used for a layer which is not in contact with ITO or the like. The thickness of the auxiliary wiring can be greater than or equal to 0.1 µm and less than or equal to 3 µm, preferably greater than or equal to 0.1 µm and less than or equal to 0.5 µm.

[Sealant]

A method for sealing the light-emitting panel is not limited, and either solid sealing or hollow sealing can be employed. For example, a glass material such as a glass frit, or a resin material such as a resin that is curable at room temperature (e.g., a two-component-mixture-type resin), a light curable resin, or a heat-curable resin can be used. The light-emitting panel may be filled with an inert gas such as nitrogen or argon, or resin such as a polyvinyl chloride (PVC) resin, an acrylic resin, a polyimide resin, an epoxy resin, a silicone resin, a polyvinyl butyral (PVB) resin, or an ethylene vinyl acetate (EVA) resin. A drying agent may be contained in the resin.

[Outcoupling Structure]

For the outcoupling structure, a hemispherical lens, a micro lens array, a film provided with an uneven surface structure, a light diffusing film, or the like can be used. For example, the outcoupling structure can be formed by attaching the lens or film to the substrate with an adhesive or the like that has substantially the same refractive index as the substrate or the lens or film.

The light-emitting panels described in this embodiment are planar light sources. Thus, by using each of the light-emitting panels in a light-emitting device, the light-emitting device is less likely to produce a shadow on a photographic subject even when used as a flash. A light-emitting panel of the light-emitting device is less likely to deteriorate even when it emits a large amount of light as compared to the case of using a light-emitting diode or the like using an inorganic material. Thus, the light-emitting device can have high reliability. The light-emitting device can be small and thin as compared to the case of using a xenon lamp or the like.

This embodiment can be combined with any of the other embodiments in this specification as appropriate.

Embodiment 5

In this embodiment, light-emitting elements that can be used in the light-emitting device of one embodiment of the present invention are described with reference to FIGS. 12A to 12D.

<<Structure Example of Light-Emitting Element>>

Figure 12A:
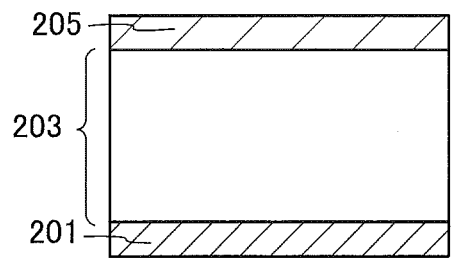
FIGS. 12A to 12D each illustrate a light-emitting element.

A light-emitting element illustrated in FIG. 12A includes an EL layer 2203 between a first electrode 2201 and a second electrode 2205. In this embodiment, the first electrode 2201 serves as the anode, and the second electrode 2205 serves as the cathode.

When a voltage higher than the threshold voltage of the light-emitting element is applied between the first electrode 2201 and the second electrode 2205, holes are injected to the EL layer 2203 from the first electrode 2201 side and electrons are injected to the EL layer 2203 from the second electrode 2205 side. The injected electrons and holes are recombined in the EL layer 2203 and a light-emitting material contained in the EL layer 2203 emits light.

The EL layer 2203 includes at least a light-emitting layer 2303 containing a light-emitting substance.

In addition to the light-emitting layer, the EL layer 2203 may further include one or more layers containing any of a substance with a high hole-injection property, a substance with a high hole-transport property, a substance with a high electron-transport property, a substance with a high electron-injection property, a substance with a bipolar property (a substance with a high electron-transport property and a high hole-transport property), and the like. For the EL layer 2203, either a low molecular compound or a high molecular compound can be used, and an inorganic compound may also be used.

Figure 12B:
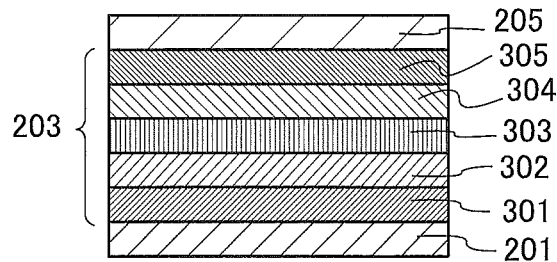

A light-emitting element illustrated in FIG. 12B includes the EL layer 2203 between the first electrode 2201 and the second electrode 2205, and in the EL layer 2203, a hole-injection layer 2301, a hole-transport layer 2302, the light-emitting layer 2303, an electron-transport layer 2304, and an electron-injection layer 2305 are stacked in this order from the first electrode 2201 side.

Figure 12C:
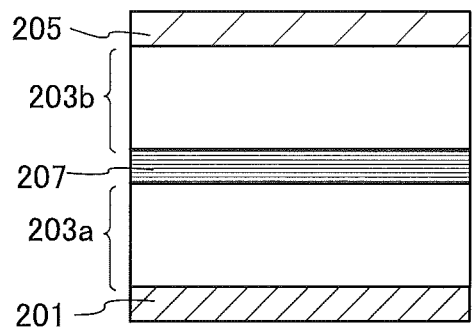
Figure 12D:
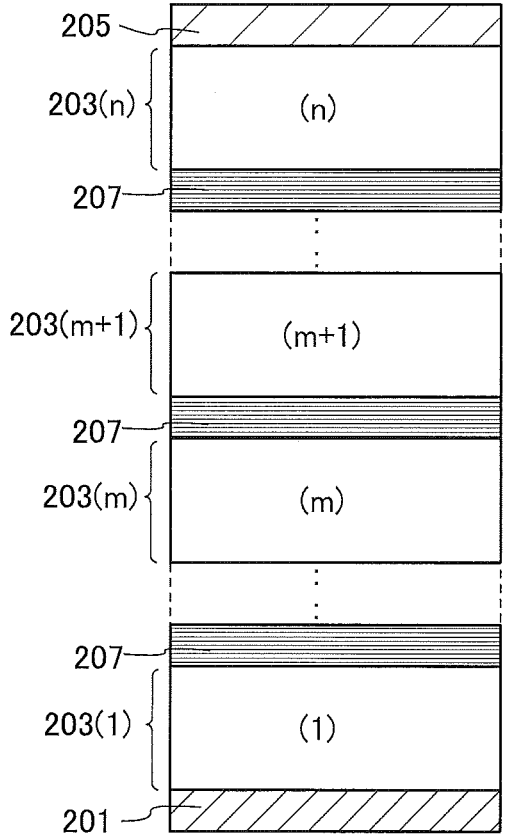

As in light-emitting elements illustrated in FIGS. 12C and 12D, a plurality of EL layers may be stacked between the first electrode 2201 and the second electrode 2205. In that case, an intermediate layer 2207 is preferably provided between the stacked EL layers. The intermediate layer 2207 includes at least a charge-generation region.

For example, the light-emitting element illustrated in FIG. 12C includes the intermediate layer 2207 between a first EL layer 2203a and a second EL layer 2203b. The light-emitting element illustrated in FIG. 12D includes n EL layers (n is a natural number of 2 or more), and the intermediate layers 2207 between the EL layers.

The behaviors of electrons and holes in the intermediate layer 2207 provided between the EL layer 2203($m$) and the EL layer 2203($m$+1) are described below. When a voltage higher than the threshold voltage of the light-emitting element is applied between the first electrode 2201 and the second electrode 2205, holes and electrons are generated in the intermediate layer 2207, and the holes move into the EL layer 2203($m$+1) provided on the second electrode 2205 side and the electrons move into the EL layer 2203($m$) provided on the first electrode 2201 side. The holes injected into the EL layer 2203($m$+1) are recombined with the electrons injected from the second electrode 2205 side, so that a light-emitting material contained in the EL layer 2203(*m*+1) emits light. The electrons injected into the EL layer 2203(*m*) are recombined with the holes injected from the first electrode 2201 side, so that a light-emitting material contained in the EL layer 2203(*m*) emits light. Thus, the holes and electrons generated in the intermediate layer 2207 cause light emission in the respective EL layers.

Note that the EL layers can be provided in contact with each other with no intermediate layer therebetween when these EL layers allow the same structure as the intermediate layer to be formed therebetween. For example, when the charge-generation region is formed over one surface of an EL layer, another EL layer can be provided in contact with the surface.

When the EL layers have different emission colors, a desired emission color can be obtained from the whole light-emitting element. For example, in the light-emitting element having two EL layers, when an emission color of the first EL layer and an emission color of the second EL layer are made to be complementary colors, a light-emitting element emitting white light as a whole light-emitting element can also be obtained. This can be applied to a light-emitting element including three or more EL layers.

<<Material of Light-Emitting Element>>

Examples of materials that can be used for the layers are given below. Note that each layer is not limited to a single layer and may be a stack of two or more layers.

<Anode>

The electrode serving as the anode (the first electrode 2201) can be formed using one or more kinds of conductive metals, alloys, conductive compounds, and the like. In particular, it is preferable to use a material with a high work function (4.0 eV or more). Examples include indium tin oxide (ITO), indium tin oxide containing silicon or silicon oxide, indium zinc oxide, indium oxide containing tungsten oxide and zinc oxide, graphene, gold, platinum, nickel, tungsten, chromium, molybdenum, iron, cobalt, copper, palladium, and a nitride of a metal material (e.g., titanium nitride).

When the anode is in contact with the charge-generation region, any of a variety of conductive materials can be used regardless of their work functions; for example, aluminum, silver, an alloy containing aluminum, or the like can be used.

<Cathode>

The electrode serving as the cathode (the second electrode 2205) can be formed using one or more kinds of conductive metals, alloys, conductive compounds, and the like. In particular, it is preferable to use a material with a low work function (3.8 eV or less). Examples include aluminum, silver, an element belonging to Group 1 or 2 of the periodic table (e.g., an alkali metal such as lithium or cesium, an alkaline earth metal such as calcium or strontium, or magnesium), an alloy containing any of these elements (e.g., Mg—Ag or Al—Li), a rare earth metal such as europium or ytterbium, and an alloy containing any of these rare earth metals.

Note that when the cathode is in contact with the charge-generation region, a variety of conductive materials can be used regardless of its work function. For example, ITO, indium tin oxide containing silicon or silicon oxide, or the like can be used.

The electrodes may be formed separately by a vacuum evaporation method or a sputtering method. Alternatively, when a silver paste or the like is used, a coating method or an inkjet method may be used.

<Hole-Injection Layer 2301>

The hole-injection layer 2301 contains a substance with a high hole-injection property.

Examples of the substance with a high hole-injection property include metal oxides such as molybdenum oxide, vanadium oxide, ruthenium oxide, tungsten oxide, and manganese oxide; and phthalocyanine-based compounds such as phthalocyanine (abbreviation: $H_2Pc$) and copper(II) phthalocyanine (abbreviation: CuPc).

Other examples of the substance with a high hole-injection property include high molecular compounds such as poly(N-vinylcarbazole) (abbreviation: PVK), poly(4-vinyl-triphenylamine) (abbreviation: PVTPA); and high molecular compounds to which acid such as poly(3,4-ethylenedioxy-thiophene)/poly(styrenesulfonic acid) (PEDOT/PSS) is added.

The hole-injection layer 2301 may serve as the charge-generation region. When the hole-injection layer 2301 in contact with the anode serves as the charge-generation region, a variety of conductive materials can be used for the anode regardless of their work functions. Materials contained in the charge-generation region are described below.

<Hole-Transport Layer 2302>

The hole-transport layer 2302 contains a substance with a high hole-transport property.

The substance with a high hole-transport property is preferably a substance with a property of transporting more holes than electrons, and is especially preferably a substance with a hole mobility of $10^{-6}$ $cm^2/Vs$ or more. A variety of compounds can be used. For example, an aromatic amine compound such as 4,4'-bis[N-(1-naphthyl)-N-phenylamino] biphenyl (abbreviation: NPB or α-NPD) or 4-phenyl-4'-(9-phenylfluoren-9-yl)triphenylamine (abbreviation: BPA-FLP); a carbazole derivative such as 4,4'-di(N-carbazolyl) biphenyl (abbreviation: CBP), 9-[4-(10-phenyl-9-anthracenyl)phenyl]-9H-carbazole (abbreviation: CzPA), or 9-phenyl-3-[4-(10-phenyl-9-anthryl)phenyl]-9H-carbazole (abbreviation: PCzPA); an aromatic hydrocarbon compound such as 2-tert-butyl-9,10-di(2-naphthyl)anthracene (abbreviation: t-BuDNA), 9,10-di(2-naphthyl)anthracene (abbreviation: DNA), or 9,10-diphenylanthracene (abbreviation: DPAnth); a high molecular compound such as PVK or PVTPA.

<Light-Emitting Layer 2303>

For the light-emitting layer 2303, a fluorescent compound that exhibits fluorescence or a phosphorescent compound that exhibits phosphorescence can be used.

Examples of the fluorescent compound that can be used for the light-emitting layer 2303 include N,N'-bis[4-(9H-carbazol-9-yl)phenyl]-N,N'-diphenylstilbene-4,4'-diamine (abbreviation: YGA2S), N-(9,10-diphenyl-2-anthryl)-N,9-diphenyl-9H-carbazol-3-amine (abbreviation: 2PCAPA), and rubrene.

Examples of the phosphorescent compound that can be used for the light-emitting layer 2303 include organometallic complexes such as bis[2-(4',6'-difluorophenyl)pyridinato-N,$C^{2'}$]iridium(III) picolinate (abbreviation: FIrpic), tris(2-phenylpyridinato-N,$C^{2'}$)iridium(III) (abbreviation: Ir(ppy)$_3$), and (acetylacetonato)bis(3,5-dimethyl-2-phenylpyrazinato)iridium(III) (abbreviation: Ir(mppr-Me)$_2$(acac)).

The light-emitting layer 2303 may have a structure in which any of the above-described light-emitting organic compounds (a light-emitting substance or a guest material) is dispersed in another substance (a host material). As the host material, a variety of kinds of materials can be used, and it is preferable to use a substance that has a lowest unoccupied molecular orbital level (LUMO level) higher than that of the guest material and has a highest occupied molecular orbital level (HOMO level) lower than that of the guest material.

With the structure in which the guest material is dispersed in the host material, crystallization of the light-emitting layer 2303 can be suppressed. In addition, concentration quenching due to high concentration of the guest material can be suppressed.

As the host material, the above-described substance with a high hole-transport property (e.g., an aromatic amine compound or a carbazole derivative) or a later-described substance with a high electron-transport property (e.g., a metal complex having a quinoline skeleton or a benzoquinoline skeleton or a metal complex having an oxazole-based or thiazole-based ligand) can be used. As the host material, specifically, a metal complex such as tris(8-quinolinolato) aluminum(III) (abbreviation: Alq) or bis(2-methyl-8-quinolinolato)(4-phenylphenolato)aluminum(III) (abbreviation: BAlq); a heterocyclic compound such as 3-(4-biphenylyl)-4-phenyl-5-(4-tert-butylphenyl)-1,2,4-triazole (abbreviation: TAZ), bathophenanthroline (abbreviation: BPhen), or bathocuproine (abbreviation: BCP); a condensed aromatic compound such as CzPA, DNA, t-BuDNA, or DPAnth; or an aromatic amine compound such as NPB can be used.

Alternatively, as the host material, a plurality of kinds of materials can be used. For example, in order to suppress crystallization, a substance such as rubrene that suppresses crystallization may be further added. In addition, NPB, Alq, or the like may be further added in order to transfer energy to the guest material more efficiently.

When a plurality of light-emitting layers are provided and emission colors of the layers are made different, light emission of a desired color can be obtained from the light-emitting element as a whole. For example, in a light-emitting element having two light-emitting layers, the emission colors of first and second light-emitting layers are complementary, so that the light-emitting element can emit white light as a whole. This can be applied to a light-emitting element including three or more light-emitting layers.

<Electron-Transport Layer 2304>

The electron-transport layer 2304 contains a substance with a high electron-transport property.

The substance with a high electron-transport property is preferably an organic compound having a property of transporting more electrons than holes, and is especially preferably a material with an electron mobility of $10^{-6}$ cm$^2$/Vs or more.

As the substance with a high electron-transport property, for example, a metal complex having a quinoline skeleton or a benzoquinoline skeleton, such as Alq or BAlq, can be used. Alternatively, a metal complex having an oxazole-based ligand or a thiazole-based ligand, such as bis[2-(2-hydroxyphenyl)benzoxazolato]zinc (abbreviation: Zn(BOX)$_2$) or bis [2-(2-hydroxyphenyl)benzothiazolato]zinc (abbreviation: Zn(BTZ)$_2$) or the like can be used. Alternatively, TAZ, BPhen, BCP, or the like can be used.

<Electron-Injection Layer 2305>

The electron-injection layer 2305 contains a substance with a high electron-injection property.

Examples of the substance with a high electron-injection property include alkali metals, alkaline earth metals, and compounds thereof, such as lithium, cesium, calcium, lithium fluoride, cesium fluoride, calcium fluoride, and lithium oxide. A rare earth metal compound such as erbium fluoride can also be used. Any of the above substances for the electron-transport layer 2304 can also be used.

<Charge-Generation Region>

The charge-generation region may have either a structure in which an electron acceptor (acceptor) is added to an organic compound with a high hole-transport property or a structure in which an electron donor (donor) is added to an organic compound with a high electron-transport property. Alternatively, these structures may be stacked.

Examples of the organic compound with a high hole-transport property include the above materials that can be used for the hole-transport layer, and examples of the organic compound with a high electron-transport property include the above materials that can be used for the electron-transport layer.

As examples of the electron acceptor, 7,7,8,8-tetracyano-2,3,5,6-tetrafluoroquinodimethane (abbreviation: F4-TCNQ), chloranil, and the like can be given. In addition, transition metal oxides can be given. Moreover, oxides of metals belonging to Groups 4 to 8 of the periodic table can be given. Specifically, it is preferable to use vanadium oxide, niobium oxide, tantalum oxide, chromium oxide, molybdenum oxide, tungsten oxide, manganese oxide, and rhenium oxide because of their high electron accepting properties. Among these, molybdenum oxide is especially preferable because it is stable in the air, has a low hygroscopic property, and is easy to handle.

As the electron donor, it is possible to use an alkali metal, an alkaline earth metal, a rare earth metal, a metal belonging to Group 13 of the periodic table, or an oxide or a carbonate thereof. Specifically, lithium, cesium, magnesium, calcium, ytterbium, indium, lithium oxide, cesium carbonate, or the like is preferably used. Alternatively, an organic compound such as tetrathianaphthacene may be used as the electron donor.

The above-described layers included in the EL layer 2203 and the intermediate layer 2207 can be limited by any of the following methods: an evaporation method (including a vacuum evaporation method), a transfer method, a printing method, an inkjet method, a coating method, and the like.

This embodiment can be combined with any of the other embodiments in this specification as appropriate.

Embodiment 6

In this embodiment, electronic appliances including the light-emitting device of one embodiment of the present invention are described with reference to FIGS. 13A to 13C, FIGS. 14A to 14C, and FIG. 15.

The light-emitting device of one embodiment of the present invention can be used for a flash of a camera such as a digital still camera, a flash of a camera incorporated in a mobile phone (also called a cellular phone or mobile phone device) or a portable information terminal having a photography function, or the like. Alternatively, the light-emitting device of one embodiment of the present invention can be used for a light of a bicycle or a car, a beacon, illuminations for decorative purposes, or the like.

Figure 13A:
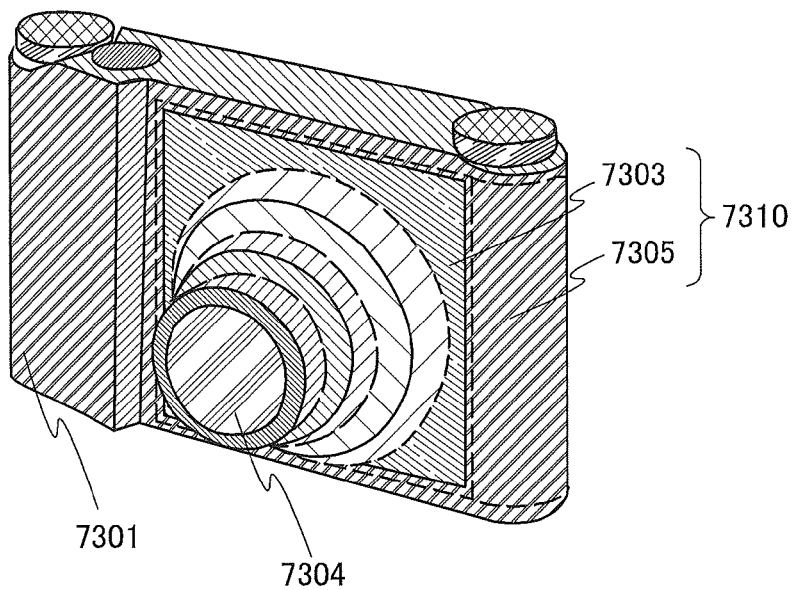
FIGS. 13A to 13C illustrate electronic devices.

FIG. 13A illustrates an example of a digital still camera. A digital still camera 7300 includes a housing 7301, a lens 7304, a light-emitting device 7310, and the like. The light-emitting device of one embodiment of the present invention is used as the light-emitting device 7310. A light-emitting portion 7303 of the light-emitting device 7310 is located so as to surround the lens 7304. The light-emitting device of one embodiment of the present invention is flexible and can thus be curved. In the digital still camera 7300, a non-light-emitting portion 7305 of the light-emitting device 7310 is bent to fit the shape of the housing 7301, which enables the light-emitting portion 7303 to be located over a large area around the lens 7304. This can make a shadow of a nose less likely to be cast on a cheek when a photograph of a human face is taken in a dark place using a flash, for example. Note that a light-emitting element may be formed in the non-light-emitting portion 7305 through the same process and may be used as an indicator of operating conditions.

Figure 13B:
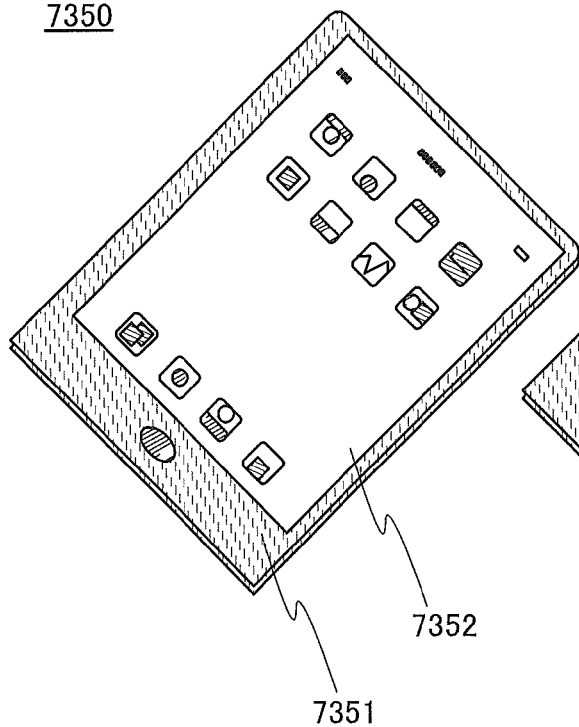
Figure 13C:
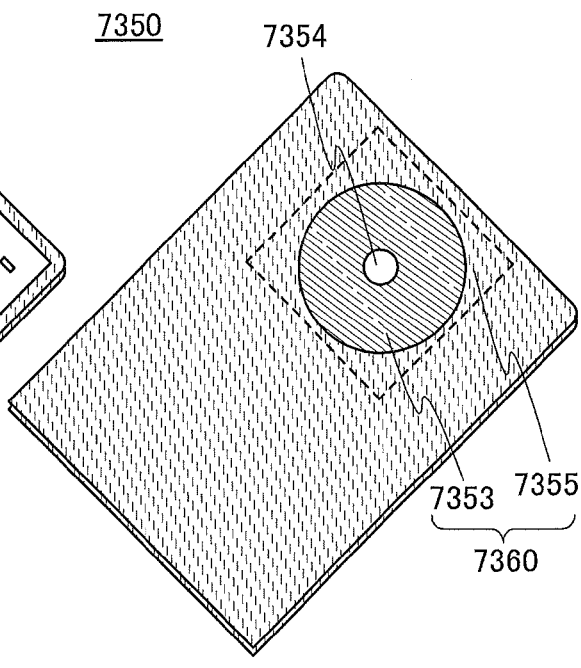

FIGS. 13B and 13C illustrate an example of a mobile phone. One side (also referred to as a front side) of a mobile phone 7350 is illustrated in FIG. 13B, and a side opposite the one side (also referred to as a back side) is illustrated in FIG. 13C.

The mobile phone 7350 includes a housing 7351, a display portion 7352, a lens 7354, a light-emitting device 7360, and the like. The light-emitting device of one embodiment of the present invention is used as the light-emitting device 7360. The light-emitting device 7360 includes a light-emitting portion 7353 and a non-light-emitting portion 7355, and the light-emitting portion 7353 is located so as to surround the lens 7354. The light-emitting portion 7353 may be used as a mirror when not emitting light.

Figure 14A:
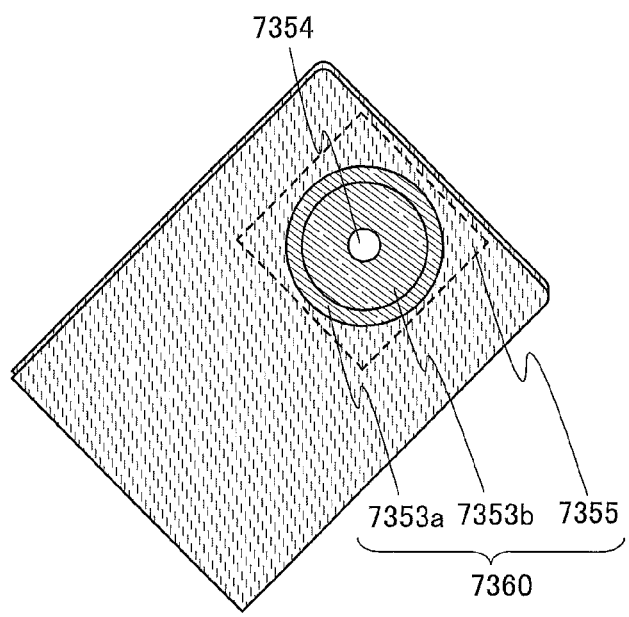
FIGS. 14A to 14C each illustrate an electronic device.

FIG. 14A illustrates a modification example of the light-emitting device 7360 of the mobile phone 7350. The light-emitting device 7360 illustrated in FIG. 14A includes two light-emitting panels 7353a and 7353b.

Figure 15:
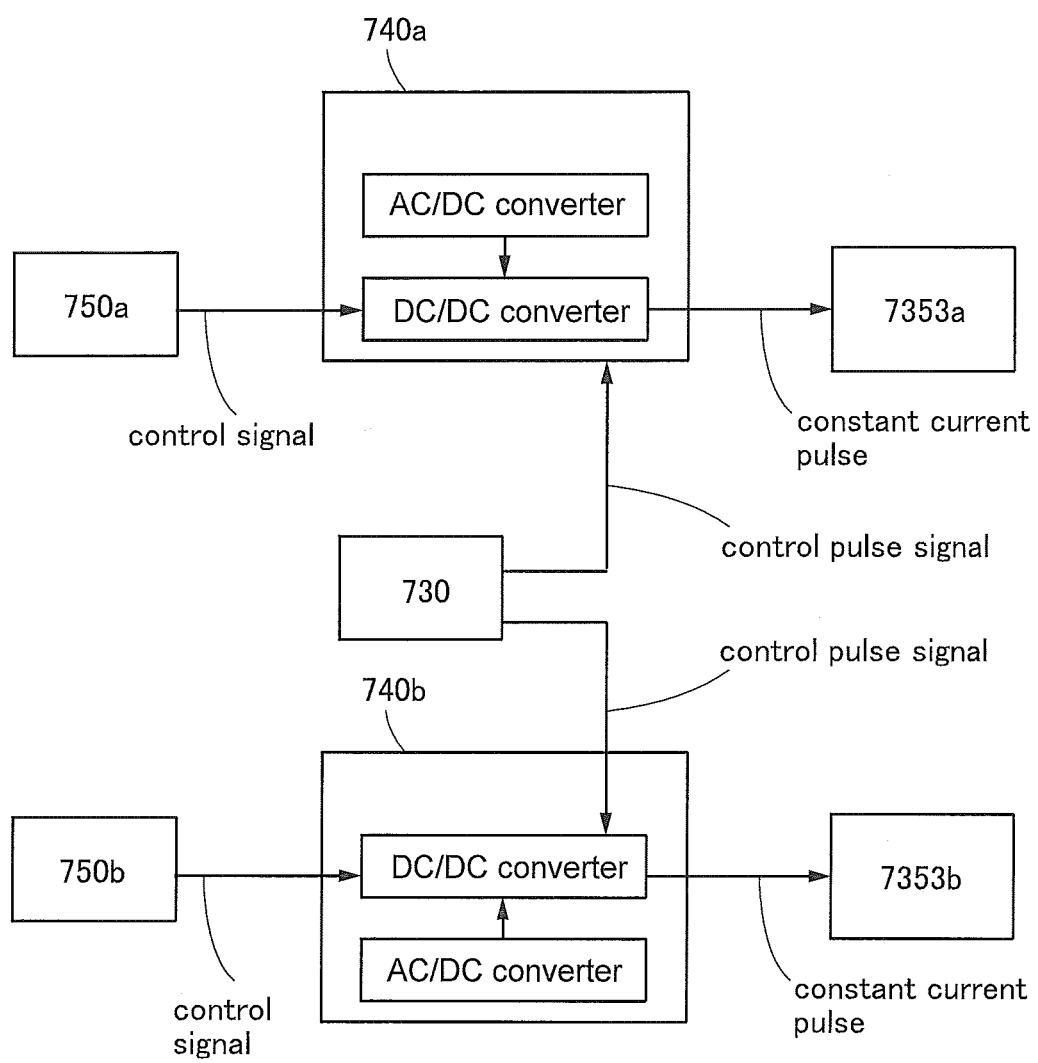
FIG. 15 illustrates a light-emitting device.

FIG. 15 is a block diagram of the light-emitting device 7360 illustrated in FIG. 14A. The light-emitting device 7360 includes the two light-emitting panels 7353a and 7353b, a driver circuit 730, two constant current supplies 740a and 740b, and two control devices 750a and 750b.

The two control devices 750a and 750b are supplied with a signal corresponding to a condition selected by a user of the mobile phone 7350 or detection signals from a variety of sensors. Each of the control devices 750a and 750b supplies a control signal corresponding to a supplied signal.

The constant current supply 740a supplies, to the light-emitting panel 7353a, a constant current pulse corresponding to a control signal supplied by the control device 750a. The constant current supply 740b supplies, to the light-emitting panel 7353b, a constant current pulse corresponding to a control signal supplied by the control device 750b. Thus, the amount of light of the light-emitting panels 7353a and 7353b is separately adjusted. As a result, the amount of light emitted from the light-emitting device can be adjusted in a wider range, which is preferable.

The light-emitting panels 7353a and 7353b may emit light with different colors or different color temperatures. For example, in the case where the two light-emitting panels have different color temperatures, the light-emitting device can emit light with an appropriate color temperature by separately adjusting the amount of light of the light-emitting panels.

The driver circuit 730 can include the microcontroller 137, the start switch circuit 131, and the pulse interval modulation circuit 135 which are described in Embodiment 1, and their structures can be similar to those described in Embodiment 1. The light-emitting panels 7353a and 7353b are separately supplied with a control pulse signal by the driver circuit 730. In other words, the driver circuit 730 may supply the same control pulse signal or different control pulse signals to the light-emitting panels 7353a and 7353b.

Note that the light-emitting device 7360 may include two or more driver circuits and may include three or more light-emitting panels. The light-emitting device 7360 may include a light-emitting panel in which the amount of light cannot be adjusted.

In the light-emitting device 7360 having the structure illustrated in FIG. 15, the light-emitting panels 7353a and 7353b can emit light independently of each other. For example, when one light-emitting panel emits a sufficient amount of light, only one light-emitting panel may be made to emit light, and only when a larger amount of light is needed, both light-emitting panels may be made to emit light. This can reduce the power consumption of the light-emitting device and suppress deterioration of the light-emitting panels.

Figure 14B:
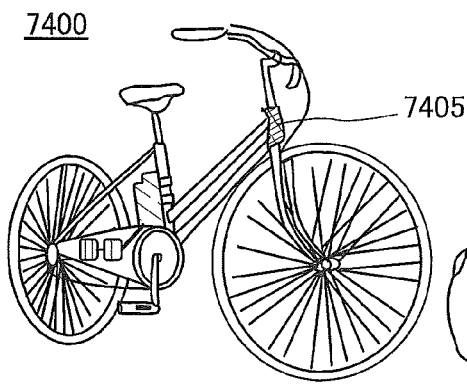

FIG. 14B illustrates an example of a bicycle. A bicycle 7400 includes a light 7405. The light 7405 includes the light-emitting device of one embodiment of the present invention.

Figure 14C:
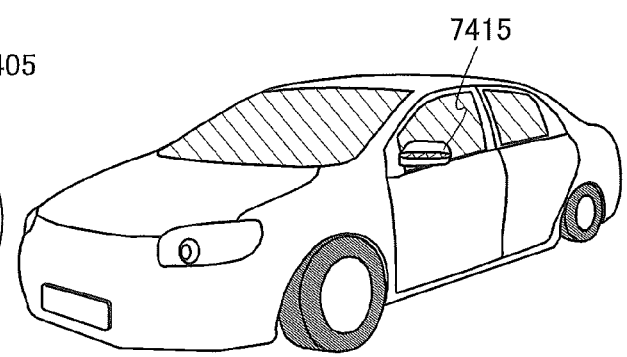

FIG. 14C illustrates an example of a car. A car 7410 includes a light 7415. The light-emitting device of one embodiment of the present invention is used for the light 7415.

In the case where the light-emitting device of one embodiment of the present invention is used for a light of a bicycle or a vehicle, after detection of the ambient brightness by an optical sensor, the following controls can be performed, for example: when the ambient brightness is sufficiently high, the light does not emit light; when the ambient brightness is sufficiently low, the light blinks; and when the ambient brightness is not sufficiently high but light is detected, the light blinks and the amount of light emitted from the light is increased. Thus, the light-emitting device of one embodiment of the present invention can emit an optimum amount of light, and a light with low power consumption can be achieved.

This embodiment can be combined with any of the other embodiments in this specification as appropriate.

Example 1

In this example, a light-emitting panel of one embodiment of the present invention is described.

FIG. 9A is a plan view of a light-emitting panel fabricated in this example, and FIG. 10B is a cross-sectional view taken along the dashed-dotted line X1-Y1 in FIG. 9A. Note that some components of the light-emitting panel are omitted FIG. 9A.

In the light-emitting panel of this example, as illustrated in FIG. 10B, the light-emitting element 1250 is provided over the support substrate 1229 having an outcoupling structure with the insulating film 1224 therebetween. The auxiliary wiring 1206 is provided over the insulating film 1224 and is electrically connected to the first electrode 1201. The auxiliary wiring 1206 is partly exposed and functions as a terminal. An end portion of the first electrode 1201 and an end portion of a conductive layer 1210 are covered with a partition wall 1205. In addition, the partition wall 1205 is provided to cover the auxiliary wiring 1206 with the first electrode 1201 therebetween. The light-emitting element 1250 is sealed with the support substrate 1229, the sealing substrate 1228, and the sealant 1227.

In the light-emitting panel of this example, a diffusion film of a polyester-based resin was used as the support substrate 1229, and a substrate including a thin glass layer and a polyethylene terephthalate (PET) layer was used as the sealing substrate 1228. These substrates are flexible, and the light-emitting panel of this example is a flexible light-emitting panel. The area of a light-emitting region of the light-emitting panel of this example is 56 mm×42 mm.

The light-emitting element 1250 is an organic EL element having a bottom-emission structure; specifically, the first electrode 1201 that transmits visible light is provided over the support substrate 1229, the EL layer 1202 is provided over the first electrode 1201, and the second electrode 1203 that reflects visible light is provided over the EL layer 1202.

A method for fabricating the light-emitting panel of this example is described.

First, a base film, a separation layer (a tungsten film), and a layer to be separated were formed in this order over a glass substrate that was a formation substrate. In this example, the layer to be separated includes the insulating film 1224, the auxiliary wiring 1206, the first electrode 1201, and the partition wall 1205.

A total of seven auxiliary wirings 1206 were formed over the insulating film 1224. At this time, the auxiliary wirings 1206 with a width L2 of 322 µm were formed at a pitch of 5.3 mm. As the first electrode 1201, a film of metal oxide containing silicon, indium, and tin (ITSO) was formed. A total of seven partition walls 1205 covering the auxiliary wirings 1206 were formed to have a width L1 of 330 µm.

Then, a temporary support substrate and the first electrode 1201 were attached to each other with a separation adhesive. Then, the layer to be separated was separated from the formation substrate along the separation layer. Thus, the separated layer was provided on the temporary support substrate side.

Next, the layer that was separated from the formation substrate and where the insulating film 1224 was exposed was attached to the support substrate 1229 using a UV curable adhesive. As the support substrate 1229, a diffusion film of a polyester-based resin was used as described above. Then, the temporary support substrate was separated, whereby the first electrode 1201 was exposed over the support substrate 1229.

Next, the EL layer 1202 and the second electrode 1203 were formed over the first electrode 1201. As the EL layer 1202, a first EL layer including a light-emitting layer containing a fluorescent compound emitting blue light, an intermediate layer, and a second EL layer including a light-emitting layer containing a phosphorescent compound emitting green light and a light-emitting layer containing a phosphorescent compound emitting red light were stacked in this order from the first electrode 1201 side. Silver was used for the second electrode 1203.

Then, a photo-curable resin containing zeolite that serves as the sealant 1227 was applied and cured by UV light irradiation. Next, the support substrate 1229 and the substrate including the thin glass layer and the polyethylene terephthalate (PET) layer that was the sealing substrate 1228 were attached to each other with a UV curable adhesive.

Figure 16:
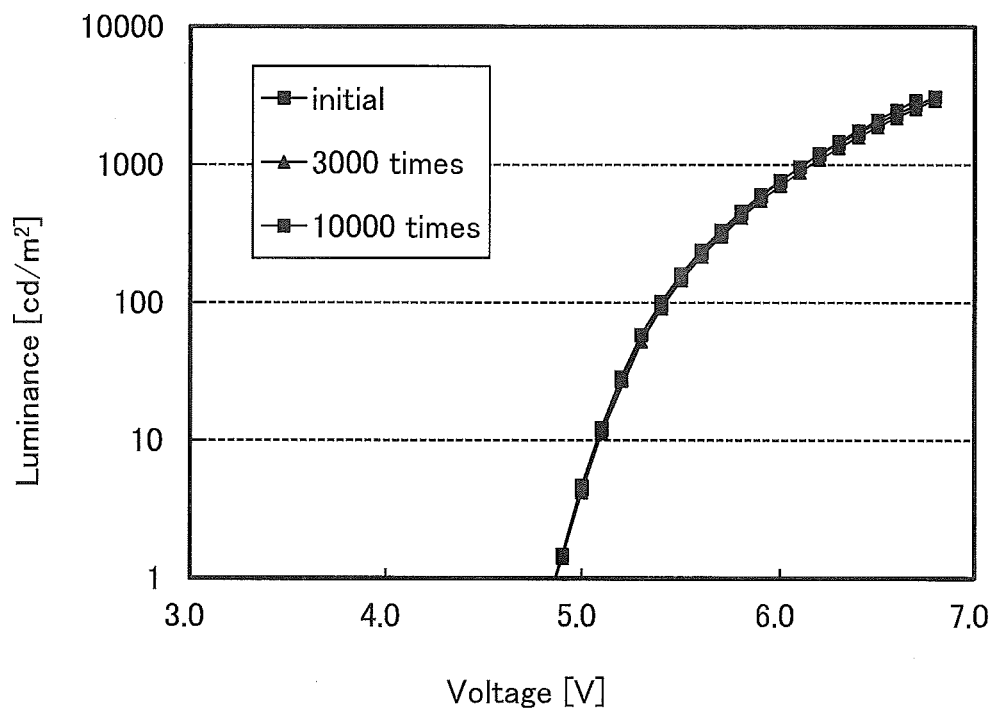
FIG. 16 shows voltage-luminance characteristics of a light-emitting panel of one example.
Figure 17:
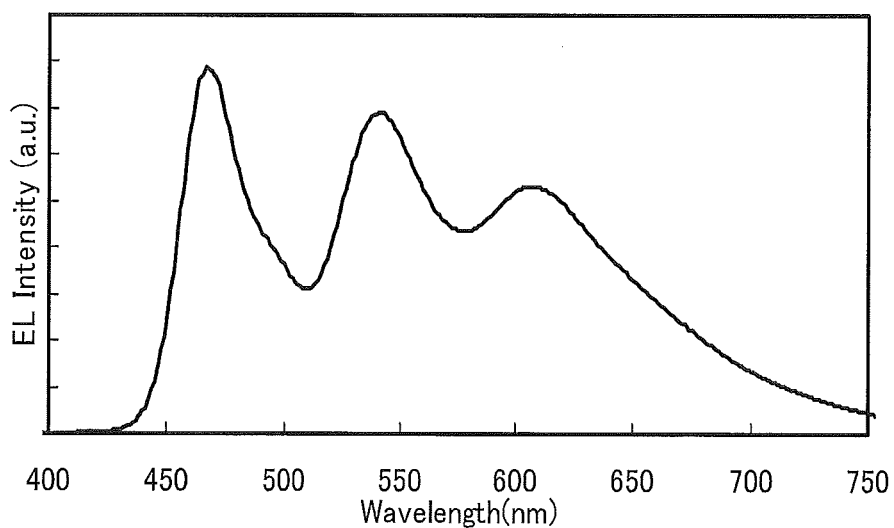
FIG. 17 shows an emission spectrum of a light-emitting panel of one example.

Operation characteristics of the light-emitting panel obtained in the above-described manner were measured. Voltage-luminance characteristics of the light-emitting panel are shown in FIG. 16 as indicated by "initial" in a legend. An emission spectrum of the light-emitting panel is shown in FIG. 17. It is found from FIG. 17 that the light-emitting panel of this example shows an emission spectrum including light originating from the fluorescent compound emitting blue light, light originating from the phosphorescent compound emitting green light, and light originating from the phosphorescent compound emitting red light.

After that, a light-emitting device including the light-emitting panel was subjected to a reliability test. In the reliability test, the light-emitting panel was made to emit light 3000 times or 10000 times with intervals. For each time of light emission, a current of 2 A was passed through the light-emitting panel for 50 milliseconds (ms). The current density of the light-emitting element at this time was 90 mA/cm$^2$. The interval between light emissions (i.e., non-light-emitting period) was 10 seconds.

FIG. 16 shows voltage-luminance characteristics of the light-emitting panel after 3000 times of light emission and those after 10000 times of light emission.

It can be seen from FIG. 16 that the voltage-luminance characteristics of the light-emitting panel even after 10000 times of light emission does not significantly differ from those before the reliability test and that the light-emitting panel does not deteriorate. This supports that the light-emitting panel of this example has high reliability.

Example 2

In this example, an organic EL element that can be used in one embodiment of the present invention is described.

In this measurement, the amount of current that can be fed to an organic EL element emitting white light was measured. The area of a light-emitting region in the organic EL element that was used was 2 mm×2 mm. For each time of light emission, current was fed to the organic EL element for 50 milliseconds (ms).

The examination showed that a current of 60 mA was able to be fed to the organic EL element (i.e., the current density was 1500 mA/cm$^2$). However, when a current of 68 mA was fed to the organic EL element (i.e., the current density was 1700 mA/cm$^2$), the organic EL element was short-circuited.

The above-described results indicate that in a light-emitting device of one embodiment of the present invention that includes the organic EL element, the amount of light can be adjusted when the current density is lower than 1700 mA/cm$^2$. Thus, a larger amount of current can be fed to the organic EL element than to a light-emitting diode or the like using an inorganic material.

Example 3

In this example, a light-emitting device of one embodiment of the present invention is described.

Figure 18:
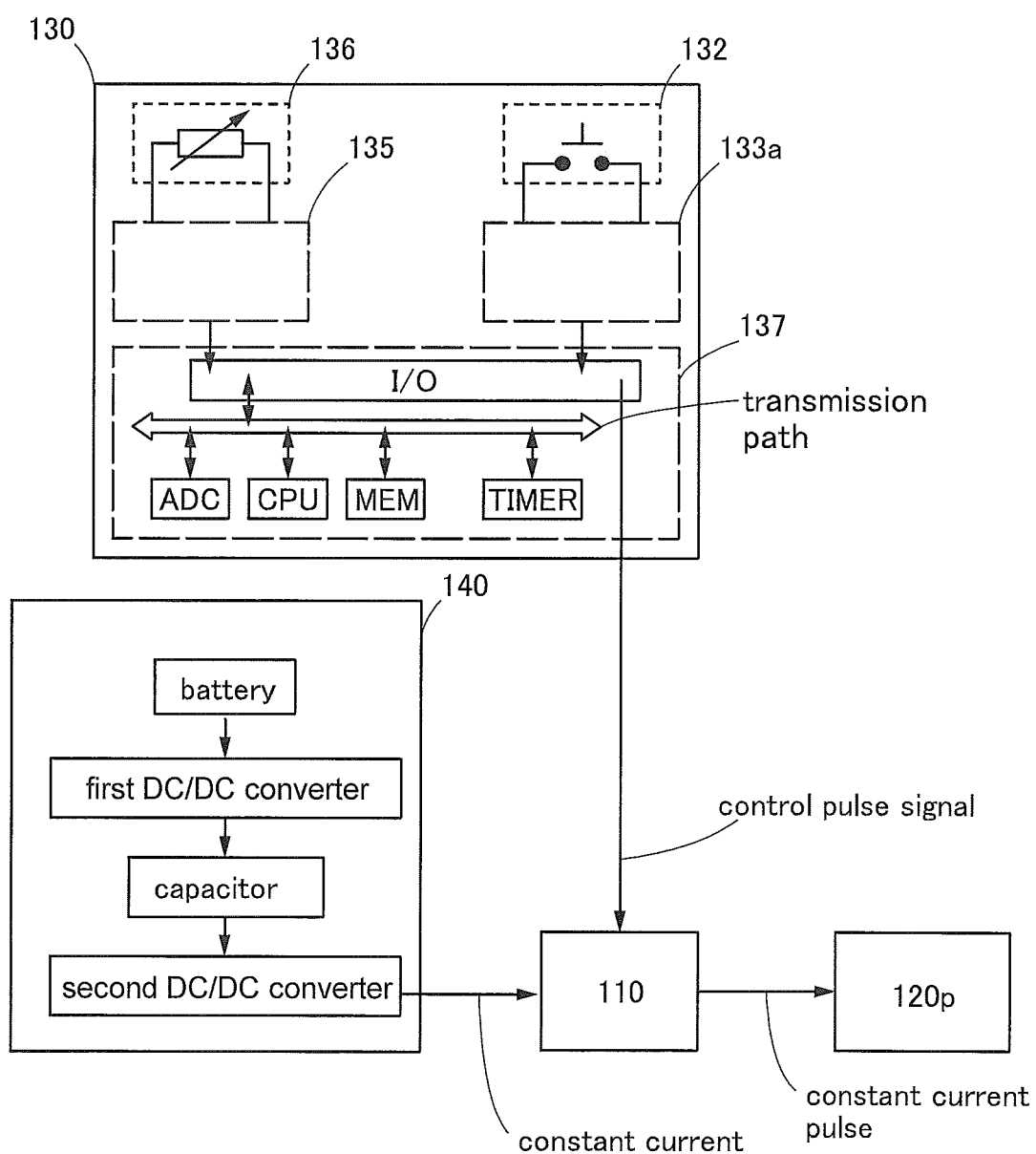
FIG. 18 illustrates a light-emitting device.

FIG. 18 is a block diagram illustrating a structure of a light-emitting device of one embodiment of the present invention.

A light-emitting device 104 described in this example includes the switching circuit 110, a light-emitting panel 120p, the driver circuit 130, and the constant current supply 140. The driver circuit 130 includes the microcontroller 137, the start switch circuit 133a, and the pulse interval modulation circuit 135. Note that the description in Embodiment 1 can be referred to for the components.

Specifically, the switching circuit 110 in this example intermittently supplies, to the light-emitting panel 120p, a constant current pulse with a current of 2 A and a width of 50 milliseconds at intervals of 0.5 seconds to 5 seconds.

FIG. 9B is a plan view of a light-emitting panel fabricated in this example, FIG. 11A is a cross-sectional view taken along the dashed-dotted line X2-Y2 in FIG. 9B, and FIG. 11C is a cross-sectional view taken along the dashed-dotted line X3-Y3 in FIG. 9B. Note that some components of the light-emitting panel are omitted in FIG. 9B.

In the light-emitting panel of this example, the light-emitting element 1250 is formed over the support substrate 1220 with the insulating film 1224 therebetween. The auxiliary wiring 1206 is provided over the insulating film 1224 and is electrically connected to the first electrode 1201. The auxiliary wiring 1206 is partly exposed and functions as a terminal. An end portion of the first electrode 1201 and an end portion of the conductive layer 1210 are covered with the partition wall 1205. In addition, the partition wall 1205 is provided to cover the auxiliary wiring 1206 with the first electrode 1201 therebetween. The light-emitting element 1250 is sealed with the support substrate 1220, the sealing substrate 1228, and the sealant 1227.

In the light-emitting panel of this example, a diffusion film of a polyester-based resin was used as the support substrate 1220, and a substrate including a thin glass layer and a polyethylene terephthalate (PET) layer was used as the sealing substrate 1228. These substrates are flexible, and the light-emitting panel of this example is a flexible light-emitting panel. Note that it can be said that the support substrate 1220 of this example has an outcoupling structure.

A light-emitting region in the light-emitting panel of this example is obtained by excluding a circular non-light-emitting region with a diameter of 20 mm from an area of 50 mm×52.9 mm. The non-light-emitting region includes an opening of the light-emitting panel. The non-light-emitting region does not include the auxiliary wiring 1206 and the first electrode 1201 (see FIG. 11A). This structure can prevent the first electrode 1201 of the light-emitting element 1250 or the auxiliary wiring 1206 from being in contact with the second electrode 1203 and being short-circuited when an opening is formed.

The light-emitting element 1250 is an organic EL element having a bottom-emission structure; specifically, the first electrode 1201 transmitting visible light is provided over the support substrate 1220, an EL layer 1202 is provided over the first electrode 1201, and a second electrode 1203 reflecting visible light is provided over the EL layer 1202.

A method for fabricating the light-emitting panel of this example is described.

First, a base film, a separation layer (a tungsten film), and a layer to be separated were formed in this order over a glass substrate that was a formation substrate. In this example, the layer to be separated includes the insulating film 1224, the auxiliary wiring 1206, the first electrode 1201, and the partition wall 1205.

A total of 125 auxiliary wirings 1206 were formed over the insulating film 1224. At this time, the auxiliary wirings 1206 with a width L2 of 3 μm were formed at a pitch of 420 μm. As the first electrode 1201, a film of metal oxide containing silicon, indium, and tin (ITSO) was formed. A total of 125 partition walls 1205 covering the auxiliary wirings 1206 were formed to have a width L1 of 6 μm. The auxiliary wirings in the light-emitting panel of this example have a width as narrow as 3 μm, and thus are less likely to be recognized when the light-emitting panel emits light.

Then, a temporary support substrate and the first electrode 1201 were attached to each other with a separation adhesive. Then, the layer to be separated was separated from the formation substrate along the separation layer. Thus, the separated layer is provided on the temporary support substrate side.

Next, the layer that was separated from the formation substrate and where the insulating film 1224 was exposed was attached to the support substrate 1220 with a UV curable adhesive. As the support substrate 1220, a diffusion film of a polyester-based resin was used as described above. Then, the temporary support substrate was separated, whereby the first electrode 1201 was exposed over the support substrate 1229.

Next, the EL layer 1202 and the second electrode 1203 were formed over the first electrode 1201. As the EL layer 1202, a first EL layer including a light-emitting layer containing a fluorescent compound emitting blue light, an intermediate layer, and a second EL layer including a light-emitting layer containing a phosphorescent compound emitting green light and a light-emitting layer containing a phosphorescent compound emitting orange light were stacked in this order from the first electrode 1201 side. Silver was used for the second electrode 1203.

Then, a UV curable resin containing zeolite that served as the sealant 1227 was applied and cured by UV light irradiation. Next, the support substrate 1220 and the substrate including the thin glass layer and the polyethylene terephthalate (PET) layer that was the sealing substrate 1228 were attached to each other with a UV curable adhesive.

Then, a circular opening was formed to overlap a non-light-emitting region surrounded by the light-emitting region. In this example, the opening is formed in part of the light-emitting panel with laser light having a wavelength in the UV region i.e., UV laser light). The opening can be formed with a punch or the like instead of laser light, in which case peeling of a film, especially the EL layer 1202 or the like, might occur because of pressure applied to the light-emitting panel. Laser light is preferably used to form the opening, in which case peeling of a film can be prevented and a highly reliable light-emitting panel can be fabricated.

Then, an end portion of the light-emitting panel that was exposed in the opening was covered with a UV curable adhesive, and the sealant 1226 was provided.

Figure 19:
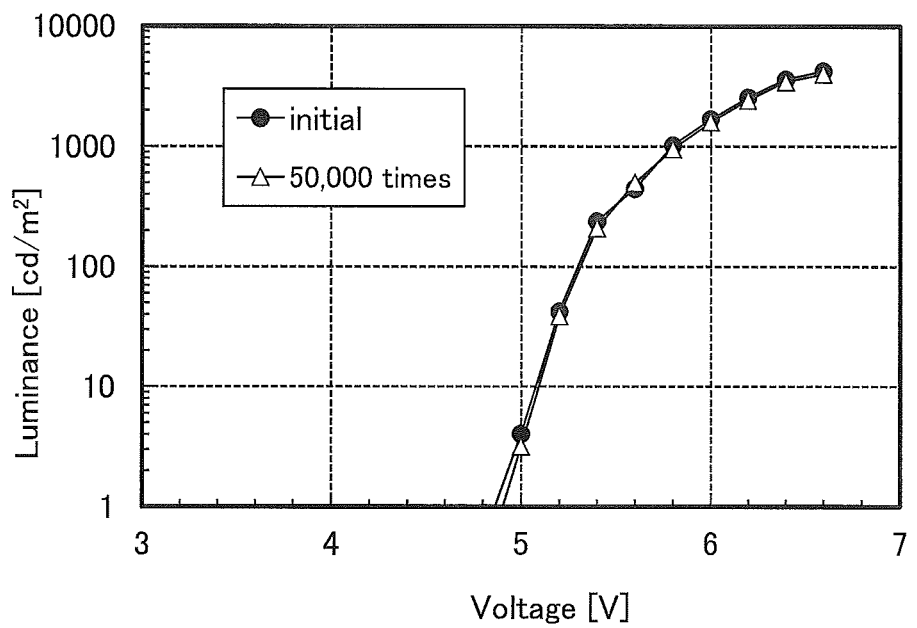
FIG. 19 shows voltage-luminance characteristics of a light-emitting panel of one example.
Figure 20:
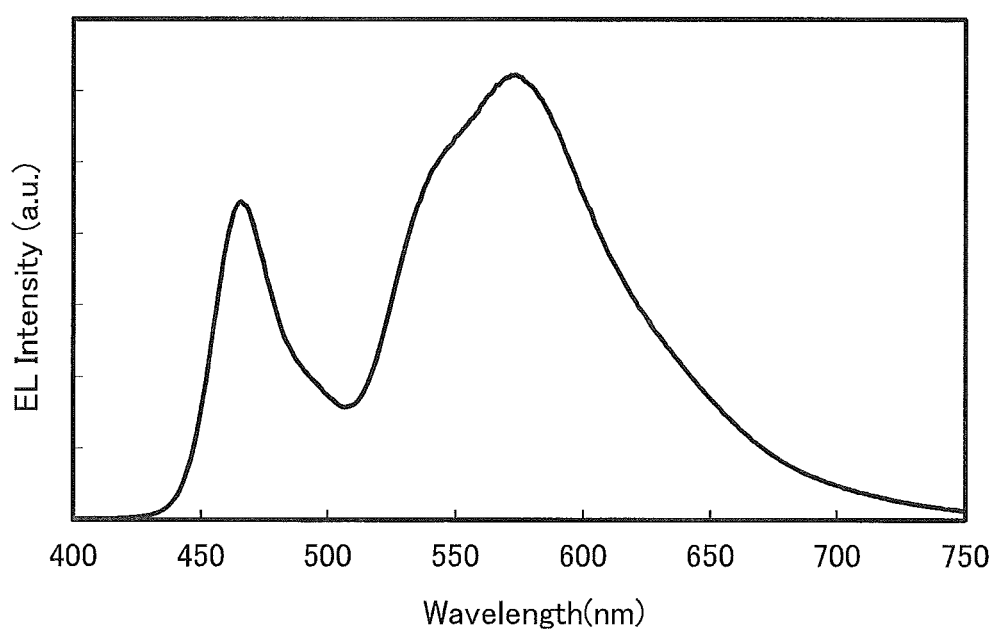
FIG. 20 shows an emission spectrum of a light-emitting panel of one example.

Operation characteristics of the light-emitting panel obtained in the above-described manner were measured. Voltage-luminance characteristics of the light-emitting panel are shown in FIG. 19 as indicated by "initial" in a legend. An emission spectrum of the light-emitting panel is shown in FIG. 20. It is found from FIG. 20 that the light-emitting panel of this example shows an emission spectrum including light originating from the fluorescent compound emitting blue light, light originating from the phosphorescent compound emitting green light, and light originating from the phosphorescent compound emitting orange light.

Note that the light-emitting panel 120*p* emits light at a luminance of approximately 100000 cd/m$^2$ when supplied with a current of 2 A.

After that, a light-emitting device including the light-emitting panel was subjected to a reliability test. In the reliability test, the light-emitting panel was made to emit light 50000 times with intervals. For each time of light emission, a current of 2 A was fed to the light-emitting panel for 50 milliseconds (ms). The current density of the light-emitting element at this time was 87 mA/cm$^2$. The interval between light emissions (non-light-emitting period) was 0.5 seconds (s).

FIG. 19 shows voltage-luminance characteristics of the light-emitting panel after 50000 times of light emission.

It can be seen from FIG. 19 that the voltage-luminance characteristics of the light-emitting panel even after 50000 times of light emission does not significantly differ from those before the reliability test and that the light-emitting panel does not deteriorate. It is indicated that even when the light-emitting panel 120*p* is made to blink for 50 milliseconds 50000 times at intervals of 0.5 seconds, heat generation due to light emission has little influence on the light-emitting panel 120*p* because the actual lighting time of the light-emitting panel is only approximately 40 minutes.

The light-emitting device 104 described in this example includes the light-emitting panel 120*p* in which an organic EL element is used. This structure can expand the light-emitting region in a plane. Thus, a small light-emitting device can be provided.

The light-emitting panel 120*p* can be lighter, thinner, and larger than another light-emitting panel using another light-emitting element (e.g., LED). Thus, the proportion of the light-emitting panel in sight can be increased easily.

When a person directly looks at a light-emitting panel that intermittently emits light at a luminance of approximately 100000 cd/m², the light is too bright for the person.

The light-emitting device 104 can be used for, for example, a security device. Specifically, with the light-emitting device 104, a person intermittently emits light toward an assailant when attacked. This can make the assailant flinch and hesitate to attack.

In addition, when the light-emitting device 104 is provided in a portable camera or a mobile phone with a camera, the light-emitting device 104 can function as both a flash and a security device. Note that the amount of current supplied by the constant current supply 140 may be changed depending on the purpose or the ambient brightness. Specifically, the luminance of the light-emitting device 104 that is used as a security device may be higher than the luminance of the light-emitting device 104 that is used as a camera flash.

In addition, when the light-emitting device 104 is used as a warning light of, for example, a bicycle, the position of the bicycle can be recognized by other vehicles, passersby, or the like. This can prevent accidents.

This application is based on Japanese Patent Application serial no. 2013-194055 filed with Japan Patent Office on Sep. 19, 2013, the entire contents of which are hereby incorporated by reference.

What is claimed is:

1. A portable information terminal comprising:
   a housing;
   a light emitting region provided on a first surface of the housing;
   an imaging unit provided on the first surface of the housing; and
   a communication unit configured to transmit image information to a communication network,
   wherein the light emitting region is capable of emitting pulsed light;
   wherein the imaging unit is capable of being supplied with a shutter signal and performing imaging in an emission direction of the pulsed light and supplying the image information;
   wherein a total area of the light emitting region is greater than or equal to 15 cm² and less than or equal to 100 cm².

2. The portable information terminal according to claim 1, wherein emission time is greater than or equal to 1 millisecond and less than or equal to 1000 milliseconds.

3. The portable information terminal according to claim 1, wherein the pulsed light emits every time the shutter signal is supplied.

4. The portable information terminal according to claim 1, wherein a step of supplying the shutter signal to the imaging unit, a step of performing the imaging, a step of supplying image information, and a step of transmitting the image information to the communication network are performed automatically.

5. The portable information terminal according to claim 1, wherein the shutter signal is generated by operating a switch.

6. The portable information terminal according to claim 1, further comprising a human sensor.

7. A portable information terminal comprising:
   a housing;
   a light emitting region provided on a first surface of the housing;
   an imaging unit provided on the first surface of the housing; and
   a communication unit configured to transmit image information to a communication network,
   wherein the light emitting region is capable of emitting pulsed light;
   wherein the imaging unit is capable of being supplied with a shutter signal and performing imaging in an emission direction of the pulsed light and supplying the image information;
   wherein a total area of the light emitting region is greater than or equal to 15 cm² and less than or equal to 100 cm²;
   wherein the pulsed light is emitted by a light emitting diode.

8. The portable information terminal according to claim 7, wherein emission time is greater than or equal to 1 millisecond and less than or equal to 1000 milliseconds.

9. The portable information terminal according to claim 7, wherein the pulsed light emits every time the shutter signal is supplied.

10. The portable information terminal according to claim 7, wherein a step of supplying the shutter signal to the imaging unit, a step of performing the imaging, a step of supplying image information, and a step of transmitting the image information to the communication network are performed automatically.

11. The portable information terminal according to claim 7, wherein the shutter signal is generated by operating a switch.

12. The portable information terminal according to claim 7, further comprising a human sensor.

* * * * *